United States Patent
Sivasubramanian et al.

(10) Patent No.: US 10,706,025 B2
(45) Date of Patent: Jul. 7, 2020

(54) DATABASE SYSTEM PROVIDING SINGLE-TENANT AND MULTI-TENANT ENVIRONMENTS

(71) Applicant: Amazon Technologies, Inc., Reno, NV (US)

(72) Inventors: Swaminathan Sivasubramanian, Seattle, WA (US); Stefano Stefani, Issaquah, WA (US)

(73) Assignee: Amazon Technologies, Inc., Seattle, WA (US)

( * ) Notice: Subject to any disclaimer, the term of this patent is extended or adjusted under 35 U.S.C. 154(b) by 1542 days.

(21) Appl. No.: 13/780,077

(22) Filed: Feb. 28, 2013

(65) Prior Publication Data

US 2014/0244585 A1 Aug. 28, 2014

(51) Int. Cl.
G06F 16/30 (2019.01)
G06F 16/21 (2019.01)

(52) U.S. Cl.
CPC .................. *G06F 16/21* (2019.01)

(58) Field of Classification Search
None
See application file for complete search history.

(56) References Cited

U.S. PATENT DOCUMENTS

| | | | |
|---|---|---|---|
| 8,326,876 B1 | 12/2012 | Venkataraman et al. | |
| 8,924,542 B1 * | 12/2014 | Gabrielson | H04L 12/4641 709/224 |
| 2006/0235831 A1 * | 10/2006 | Adinolfi | G06Q 40/00 |
| 2008/0270459 A1 | 10/2008 | Grewal et al. | |

(Continued)

FOREIGN PATENT DOCUMENTS

| | | |
|---|---|---|
| JP | 2012522325 | 9/2012 |
| WO | 2012054185 | 4/2012 |

OTHER PUBLICATIONS

Cihan Biyikoglu, https://blogs.msdn.microsoft.com/cbiyikoglu/2011/03/23/moving-to-multi-tenant-database-modelmade-easy-with-sql-azure-federations/, dated Mar. 23, 2011.*

(Continued)

*Primary Examiner* — Irete F Ehichioya
*Assistant Examiner* — Johnese T Johnson
(74) *Attorney, Agent, or Firm* — Robert C. Kowert; Kowert, Hood, Munyon, Rankin & Goetzel, P.C.

(57) ABSTRACT

A database service may provide multi-tenant and single-tenant environments in which tables may be maintained on behalf of clients. The service (or underlying system) may create database instances and tables in either or both types of environments (e.g., by default or according to various parameter values specified in requests to create the instances or tables). When receiving and servicing requests directed to a table hosted in a single-tenant environment, the system may elide at least some of the authentication or metering operations that would be performed when servicing requests directed to tables hosted in a multi-tenant environment. Tables may be moved from a single-tenant environment to a multi-tenant environment, or vice versa, automatically by the system (e.g., dependent on an observed, expected, or desired throughput) or in response to an explicit request from a client to do so (e.g., to increase throughput or reduce cost).

24 Claims, 11 Drawing Sheets

(56) References Cited

U.S. PATENT DOCUMENTS

| | | | |
|---|---|---|---|
| 2011/0173294 A1* | 7/2011 | Jackson | G06F 17/30575 709/217 |
| 2011/0225165 A1 | 9/2011 | Burstein | |
| 2011/0258179 A1 | 10/2011 | Weissman et al. | |
| 2011/0282839 A1* | 11/2011 | Paksoy et al. | 707/640 |
| 2011/0307450 A1* | 12/2011 | Hahn | G06F 17/30339 707/649 |
| 2012/0173581 A1 | 7/2012 | Hartig et al. | |
| 2012/0173589 A1* | 7/2012 | Kwon | G06F 17/30575 707/803 |
| 2012/0254258 A1 | 10/2012 | Gao et al. | |
| 2012/0310965 A1 | 12/2012 | Gao | |

OTHER PUBLICATIONS

International Search Report and Written Opinion from PCT/US14/19448, dated Sep. 9, 2014, Amazon Technologies, Inc., pp. 1-21.
Partial Supplementary European Search Report from Application No. 14756916.4, dated Aug. 10, 2016, Amazon Technologeis, Inc.
Microsoft, "3—Choosing a Multi-Tenant Data Architecture", Retrieved from URL: https://web.archive.org/web/20130119184049/http://msdn.microsoft.com/en-us/library/hh534480.aspx, Jan. 19, 2013, pp. 1-28.
Microsoft, "Windows Azure SQL Database: How to create Windows Azure SQL Database", Retrieved from URL: https://blog.msdn.microsoft.com/umits/2012/11/16/windows-azure-sql-database-how-to-create-windows-azure-sql-database/, Nov. 16, 2012. pp. 1-6.
Gregory Leake, Data Series: SQL Server in Windows Azure Virtual Machine vs SQL Database, Posted on Jun. 26, 2012, Retrieved from URL: https://azure.microsoft.com/en-us/blog/data-series-sql-server-in-windows-azure-virtual-machine-vs-sql-database/, pp. 1-6.
Office Action from Japanese Application No. 2015-560353, dated Dec. 6, 2016 (English Translation and Japanese version), pp. 1-5.
"Business Communication", vol. 48, No. 4, Apr. 1, 2011, Japan, p. 51 (English translation and Japanese version).
Extended European Serach Report from PCT/US2014/019448, dated Dec. 9, 2016, Amazon Technologies, Inc., pp. 1-21.
Anonymous, "Optimizing Provisioned Throughput in Amazon DynamoDB—AWS Blog", Sep. 12, 2012, Retrieved from URL: https://aws.amazon.com/blogs/aws/optimizing-provisioned-throughput-in-amazon-dynamodb/, pp. 1-3.
Anonymous, "Read-Only Snapshots", Jun. 15, 2015, Retrieved from URL: https:/web.archive.org/web/20120615200933/http://docs.oracle/cd/A57673_01/DOC/server/doc/SD273/ch3.htm, pp. 1-15.
Office Action from Chinese Application No. 20148001865.1, dated Nov. 27, 2017 (English translation and Chinese version, Amazon Technologies, Inc., pp. 1-24.
Frederick Chong, et al., "Multi-Tenant Data Architecture", The Journal of Pharmacology and Experimental Therapeutics, vol. 2011, No. 3, Jun. 30, 2006, pp. 1-18.

* cited by examiner

DATABASE SYSTEM PROVIDING SINGLE-TENANT AND MULTI-TENANT ENVIRONMENTS

BACKGROUND

Several leading technology organizations are investing in building technologies that sell "software-as-a-service". Such services provide access to shared storage (e.g., database systems) and/or computing resources to clients, or subscribers. Within multi-tier e-commerce systems, different resources may be allocated to subscribers and/or their applications from whole machines, to CPU, to memory, to network bandwidth, and to I/O capacity.

Interaction between client applications and database servers typically includes read operations (read-only queries), write operations (to store data), and update operations that can be conceptualized using a read-modify-write workflow.

A database service that implements a multi-tenant environment typically partitions data across multiple storage nodes and co-locates tables that are maintained on behalf of different customers together (e.g., on the same storage nodes and/or in the same database instance). A database service that implements a single-tenant environment isolates the tables it maintains on behalf of different clients from each other (e.g., maintaining them on different storage nodes and/or in different database instances).

Figure 1:
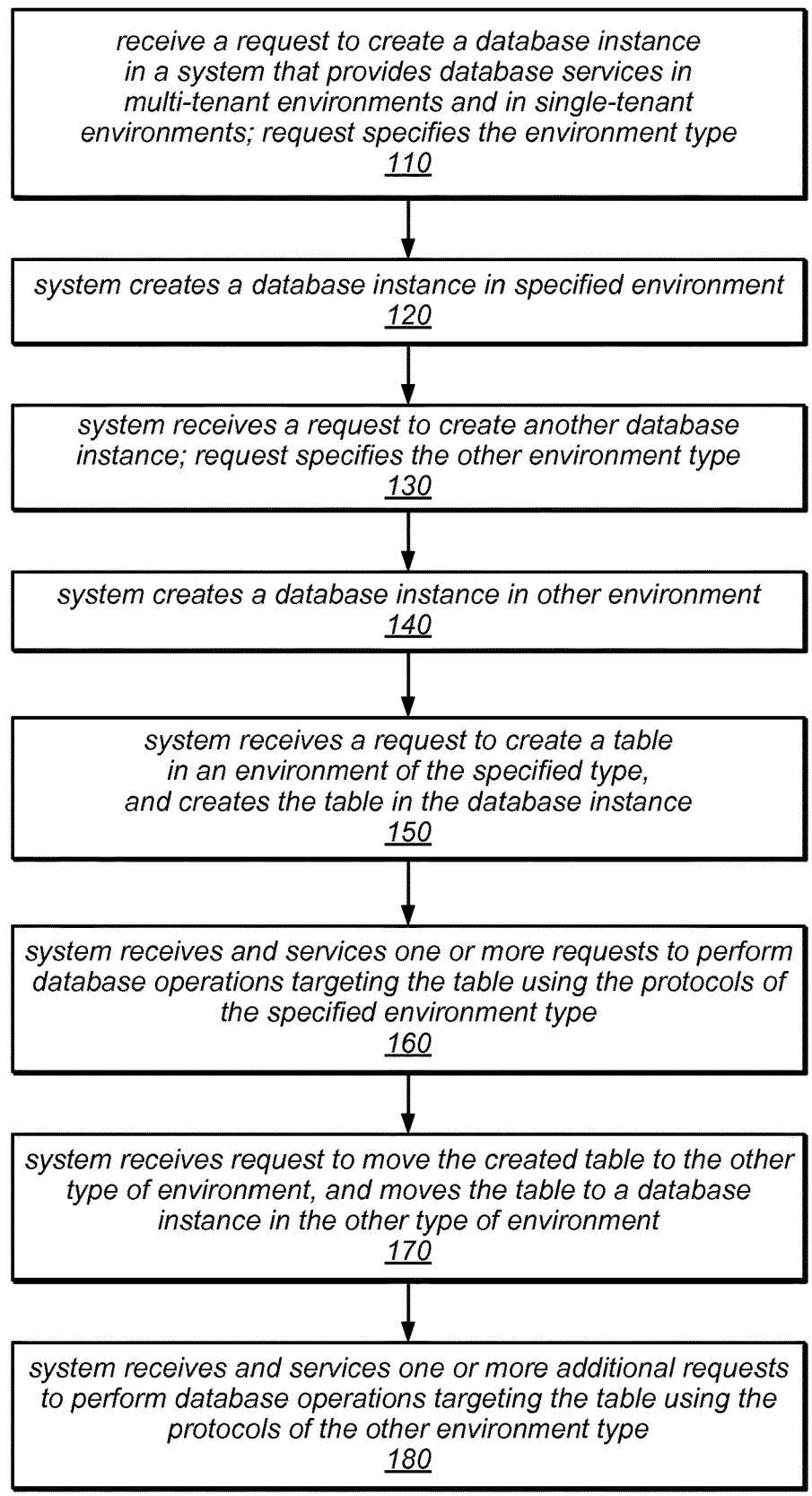
FIG. 1 is a flow diagram illustrating one embodiment of a method for creating database instances and database tables in multi-tenant environments and in single-tenant environments.

While the technology described herein is susceptible to various modifications and alternative forms, specific embodiments thereof are shown by way of example in the drawings and will herein be described in detail. It should be understood, however, that the drawings and detailed description thereto are not intended to limit the disclosure to the particular form disclosed, but on the contrary, the intention is to cover all modifications, equivalents and alternatives falling within the spirit and scope of the present disclosure as defined by the appended claims.

DETAILED DESCRIPTION

As noted above, a database service that implements a multi-tenant environment would typically partition data across multiple storage nodes and co-locate tables that are maintained on behalf of different customers together (e.g., on the same storage nodes and/or in the same database instance). A multi-tenant database service would typically handle security, quality of service compliance, service level agreement enforcement, service request metering, and/or other table management activities for the tables it hosts for different clients collectively. This multi-tenant model tends to decrease the cost of database service for customers, at least in the aggregate. However, if a client desires to receive database services in a very high-scale use case (e.g., one in which the client requires a throughput of 1 million reads per second and/or 1 million writes per second), a single-tenant model may be more cost effective for the client than a multi-tenant environment. For example, including the functionally required to support multi-tenancy and to provide security, compliance/enforcement, and/or metering operations in the system may constrain (e.g., decrease) the amount of throughput that the system may be able to achieve for individual storage nodes.

In some embodiments, a computing system that provides database services to clients may provide both multi-tenant and single-tenant environments in which tables may be created, maintained, and/or managed on behalf of clients. As described in more detail herein, the database service (or the underlying computing system) may create database instances and tables in either or both of these types of environments (e.g., by default or according to various parameter values specified in requests to create the instances or tables). In some embodiments, when receiving and servicing requests directed to a table hosted in a single-tenant environment, the system may elide at least some of the administrative operations that would be performed when servicing requests directed to tables hosted in a multi-tenant environment (e.g., some authentication and/or metering operations). For example, since a database service that implements a single-tenant environment may isolate the tables it maintains on behalf of different clients from each other (e.g., maintaining them on different storage nodes and/or in different database instances), some or all of these operations may not be required in order to securely and efficiently manage the table and to service requests directed to it.

As described in more detail herein, in some embodiments, tables may be moved from a single-tenant environment to a multi-tenant environment, or vice versa, automatically by the system (e.g., dependent on an observed, expected, or desired throughput) or in response to an explicit request from a client to do so (e.g., in order to increase throughput or reduce cost).

In some embodiments, the database service may offer clients (which may include client applications, users, and/or database service subscribers) the ability to provision one or more database instances in a single-tenant environment and to create multiple tables in those instances, as well as to provision one or more database instances (and to create tables in those instances) in a multi-tenant environment. The underlying system may create those database instances for the different types of environments using different underlying database types while exposing the same functionality and/or interfaces to the clients for tables created in the two types of environments. For example, in one embodiment, database instances created in a multi-tenant environment may be implemented as non-relational database, while database instances created in a single-tenant environment may be implemented as relational databases, but the application programming interfaces and/or graphical user interfaces for interacting with these database instances and/or the tables hosted therein may expose the same functionality to clients. In some embodiments, client may experience the same predictability and scalability (including, e.g., automatic scaling) for tables hosted in database instances in either environment.

One embodiment of a method for creating database instances and database tables in multi-tenant environments and in single-tenant environments is illustrated by the flow diagram in FIG. 1. As illustrated at 110, in this example, the method may include receiving a request to create a database instance in a system that provides database services in multi-tenant environments and in single-tenant environments. In some embodiments, the request may specify the environment type (e.g., multi-tenant or single-tenant). In other embodiments, the selection of an environment type in which to create a requested database instance may be based on a pre-determined policy specifying a default or initial selection for database instances created in the database system. As illustrated in FIG. 1, in response to the request, the method may include the database system (or a module thereof) creating a database instance in the specified type of environment, as in 120. The method may also include the system receiving a request to create another database instance, where this other request specifies the other environment type (e.g., multi-tenant or single-tenant), as in 130. In response to the request, the database system (or a module thereof) may create a database instance in the other type of environment, as in 140.

In some embodiments, the method may include the database system receiving a request to create a table in an environment of the specified type, and creating the table in the corresponding database instance, as in 150. The method may include the database system receiving and servicing one or more requests to perform database operations targeting the table (e.g., operations to store and/or retrieve items in the table) using the protocols of the specified environment type, as in 160. In some embodiments, the method may include the database system receiving a request to move the created table to the other type of environment, and in response to this request, the system may move the table to a database instance in the other type of environment, as in 170. Subsequently, the method may include the system receiving and servicing one or more additional requests to perform database operations targeting the table using the protocols of the other environment type, as in 180.

In some embodiments, creating a database instance in either tenancy environment type may include creating a cluster of storage nodes (e.g., a cluster of three storage nodes), and a client may be able to request (or otherwise initiate) the creation of multiple database instances of different types. In some embodiments, a client may be able to create and access multiple tables (e.g., to perform various database operations) in a single-tenant environment and the system may allow the client to exceed a pre-determined, expected, or negotiated throughout rate for service requests (e.g., in terms of reads and writes per second as desired. In other words, when a client's tables are hosted on a database instance that is dedicated to the client, the system may allow the client to burst (at least on a temporary basis). By contrast, for tables created on behalf of the client in a multi-tenant database instance, the system may only allow (and/or guarantee) an amount of throughput that was requested, specified, and/or negotiated when the table was created. Thus, in database systems that support both a multi-tenant model and a single-tenant mode, a client may be able to make tradeoffs between latency, predictability, and throughput.

Figure 2:
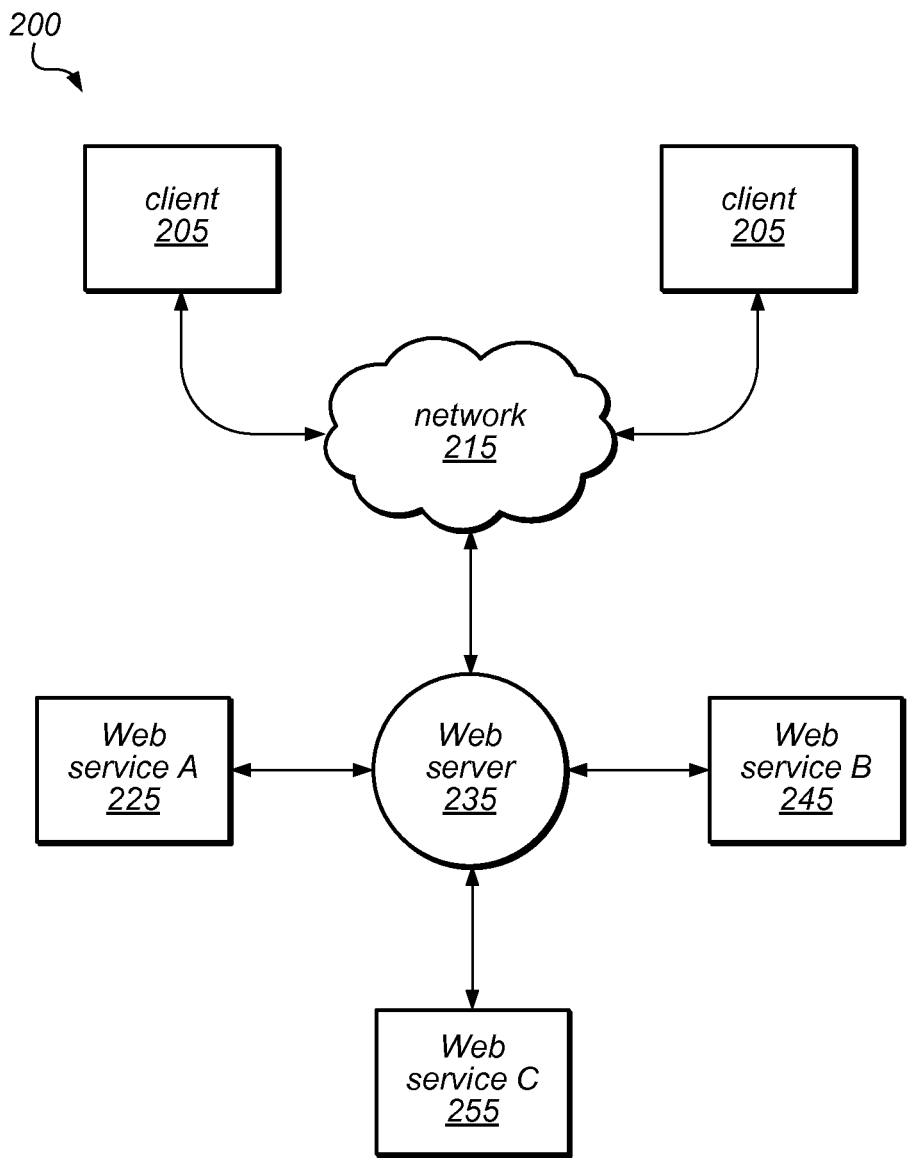
FIG. 2 is a block diagram illustrating one embodiment of a system that provides various Web-based services to clients.

Various techniques described herein may be employed in local or remote computing systems, including systems that provide services to users (e.g., subscribers) over the Internet or over other public or private networks, such as virtual private networks and connections to services in a virtual private cloud (VPC) environment. FIG. 2 illustrates a block diagram of a system that provides various Web-based services to clients, according to one embodiment. In this example, system 200 includes one or more clients 205. In this example, the clients 205 may be configured to interact with a Web server 235 via a communication network 215.

As illustrated in this example, the Web server 235 may be configured to process requests from clients 205 for various services, such as Web service A (225), Web service B (245), and Web service C (255), and to return results to the clients 205. Each of the web services may provide clients with one or more of: computational resources, database services, data storage services (e.g., maintaining data in one or more tables on behalf of a client), or any other types of services or shared resources.

Figure 3:
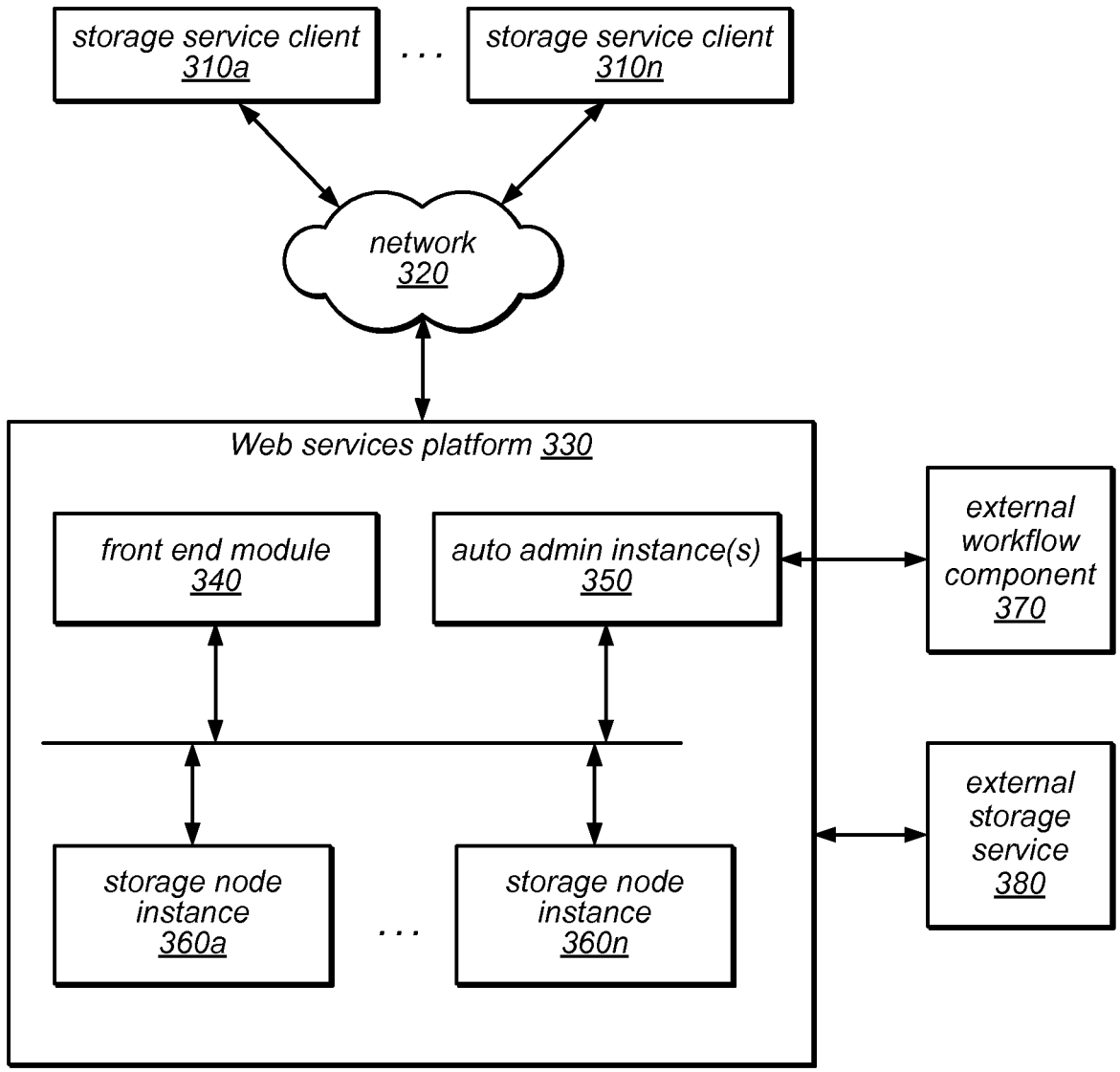
FIG. 3 is a block diagram illustrating one embodiment of a system architecture that is configured to implement a Web services-based data storage service.

One embodiment of a system architecture that is configured to implement a Web services-based data storage service such as that described herein is illustrated in FIG. 3. It is noted that where one or more instances of a given component may exist, reference to that component herein below may be made in either the singular or the plural. However, usage of either form is not intended to preclude the other. In various embodiments, the components illustrated in FIG. 3 may be implemented directly within computer hardware, as instructions directly or indirectly executable by computer hardware (e.g., a microprocessor or computer system), or using a combination of these techniques. For example, the components of FIG. 3 may be implemented by a distributed system including a number of computing nodes (or simply, nodes), such as the example computer system illustrated in FIG. 11 and described below. In various embodiments, the functionality of a given storage service system component may be implemented by a particular computing node or may be distributed across several computing nodes. In some embodiments, a given computing node may implement the functionality of more than one storage service system component.

Generally speaking, storage service clients 310a-310n may encompass any type of client configurable to submit web services requests to Web services platform 330 via network 320. For example, a given storage service client 310 may include a suitable version of a web browser, or a plug-in module or other type of code module configured to execute as an extension to or within an execution environment provided by a web browser to provide database or data storage service clients (e.g., client applications, users, and/or subscribers) access to the services provided by Web services platform 330. Alternatively, a storage service client 310 may encompass an application such as a database application, media application, office application or any other application that may make use of persistent storage resources. In some embodiments, such an application may include sufficient protocol support (e.g., for a suitable version of Hypertext Transfer Protocol (HTTP)) for generating and processing web services requests without necessarily implementing full browser support for all types of web-based data. That is, storage service client 310 may be an application configured to interact directly with Web services platform 330. In various embodiments, storage service client 310 may be configured to generate web services requests according to a Representational State Transfer (REST)-style web services architecture, a document- or message-based web services architecture, or another suitable web services architecture.

In some embodiments, storage service client 310 may be configured to provide access to web services-based storage to other applications in a manner that is transparent to those applications. For example, storage service client 310 may be configured to integrate with an operating system or file system to provide storage in accordance with a suitable variant of the storage model described herein. However, the operating system or file system may present a different storage interface to applications, such as a conventional file system hierarchy of files, directories and/or folders. In such an embodiment, applications may not need to be modified to make use of the storage system service model described herein. Instead, the details of interfacing to Web services platform 330 may be coordinated by storage service client 310 and the operating system or file system on behalf of applications executing within the operating system environment.

Storage service clients 310 may convey web services requests to and receive responses from Web services platform 330 via network 320. In various embodiments, network 320 may encompass any suitable combination of networking hardware and protocols necessary to establish web-based communications between clients 310 and platform 330. For example, network 320 may generally encompass the various telecommunications networks and service providers that collectively implement the Internet. Network 320 may also include private networks such as local area networks (LANs) or wide area networks (WANs) as well as public or private wireless networks. For example, both a given client 310 and Web services platform 330 may be respectively provisioned within enterprises having their own internal networks. In such an embodiment, network 320 may include the hardware (e.g., modems, routers, switches, load balancers, proxy servers, etc.) and software (e.g., protocol stacks, accounting software, firewall/security software, etc.) necessary to establish a networking link between given client 310 and the Internet as well as between the Internet and Web services platform 330. It is noted that in some embodiments, storage service clients 310 may communicate with Web services platform 330 using a private network rather than the public Internet. For example, clients 310 may be provisioned within the same enterprise as the data storage service (and/or the underlying system) described herein. In such a case, clients 310 may communicate with platform 330 entirely through a private network 320 (e.g., a LAN or WAN that may use Internet-based communication protocols but which is not publicly accessible).

Generally speaking, Web services platform 330 may be configured to implement one or more service endpoints configured to receive and process web services requests, such as requests to access tables maintained on behalf of clients/users by a database service or a data storage service, and/or the items and attributes stored in those tables. For example, Web services platform 330 may include hardware and/or software configured to implement various service endpoints and to properly receive and process HTTP-based web services requests directed to those endpoints. In one embodiment, Web services platform 330 may be implemented as a server system configured to receive web services requests from clients 310 and to forward them to various components that collectively implement a data storage system for processing. In other embodiments, Web services platform 330 may be configured as a number of distinct systems (e.g., in a cluster topology) implementing load balancing and other request management features configured to dynamically manage large-scale web services request processing loads.

As illustrated in FIG. 3, Web services platform 330 may include a front end module 340 (which may be configured to receive, authenticate, parse, throttle and/or dispatch service requests, among other things), one or more administrative components, or auto admin instances, 350 (which may be configured to provide a variety of visibility and/or control functions, as described in more detail herein), and a plurality of storage node instances (shown as 360a-360n), each of which may maintain and manage one or more tables on behalf of clients/users or on behalf of the data storage service (and its underlying system) itself. Some of the functionality provided by each of these types of components is described in more detail herein, according to various embodiments. Note that in some embodiments, Web services platform 330 may include different versions of some of the components illustrated in FIG. 3 to provide functionality for creating, accessing, and/or managing tables maintained in database instances within a single-tenant environment than those that provide functionality for creating, accessing, and/or managing tables maintained in database instances within a multi-tenant environment. In other embodiments, functionality to support both multi-tenant and single-tenant environments may be included in any or all of the components illustrated in FIG. 3. Note also that in various embodiments, one or more database instances may be implemented on each of the storage nodes 360a-360n, and each may store tables on behalf of clients. Some of these database instances may operate as if they were in a multi-tenant environment, and others may operate as if they were in a single-tenant environment. In some embodiments, database instances that operate as in a multi-tenant environment may be implemented on different computing nodes (or on different virtual machines executing on a single computing node) than database instances that operate as in a single-tenant environment.

In various embodiments, Web services platform 330 may be configured to support different types of web services requests. For example, in some embodiments, platform 330 may be configured to implement a particular web services application programming interface (API) that supports a variety of operations on tables that are maintained and managed on behalf of clients/users by the data storage service system (and/or data stored in those tables). Examples of the operations supported by such an API are described in more detail herein.

In addition to functioning as an addressable endpoint for clients' web services requests, in some embodiments Web services platform 330 may implement various client management features. For example, platform 330 may coordinate the metering and accounting of client usage of web services, including storage resources, such as by tracking the identities of requesting clients 310, the number and/or frequency of client requests, the size of tables and/or items stored or retrieved on behalf of clients 310, overall storage bandwidth used by clients 310, class of storage requested by clients 310, and/or any other measurable client usage parameter. Platform 330 may also implement financial accounting and billing systems, or may maintain a database of usage data that may be queried and processed by external systems for reporting and billing of client usage activity. In some embodiments, platform 330 may include a lock manager and/or a bootstrap configuration (not shown).

In various embodiments, a database service or data storage service may be implemented on one or more computing nodes that are configured to perform the functionality described herein. In some embodiments, the service may be implemented by a Web services platform (such as Web services platform 330 in FIG. 3) that is made up of multiple computing nodes, each of which may perform one or more of the functions described herein. Various collections of the computing nodes may be configured to provide the functionality of an auto-admin cluster, a cluster of resources dedicated to the data storage service, and a collection of external resources (which may be shared with other Web services or applications, in some embodiments).

In some embodiments, the external resources with which the system interacts to provide the functionality described herein may include an external workflow component, illustrated in FIG. 3 as external workflow component 370. External workflow component 370 may provide a framework through which other components interact with the external workflow system. In some embodiments, Web services platform 330 may include an access API built on top of that framework (not shown). This interface may allow the system to implement APIs suitable for the usage patterns expected to be experienced by the data storage service. In some embodiments, components or modules of the system that use external workflow component 370 may include these interfaces rather than interfacing directly to the interfaces provided by external workflow component 370. In some embodiments, the Web services platform 330 may rely on one or more external resources, such as an external storage service 380, and/or other external (and in some cases shared) external resources, in addition to external workflow component 370. In some embodiments, external workflow component 370 may be used to perform distributed operations, such as those that extend beyond a particular partition replication group.

In some embodiments, the database systems described herein may support seamless scaling of user tables in a "fully shared nothing" type architecture. For example, in some embodiments, each database partition may be implemented as a completely independent parallel computation unit. In such embodiments, the system may not provide distributed coordination across partitions or support batch "put" operations and/or multi-statement transactions. In some embodiments, as long as the workload distribution is well spread across partitions, an increase in the number of partitions may result in a larger usable table size and/or increased throughput capacity for service requests. As described herein, in some embodiments, live repartitioning (whether programmatic/automatic or explicitly initiated) may be employed to adapt to workload changes. In other words, in some embodiments, repartitioning (including partition moving, partition splitting, and other repartitioning operations) may be performed while service requests directed to the affected partitions continue to be received and processed (i.e. without taking the source partition off-line).

In some embodiments, a service (and/or underlying system) may support a variety of service offerings and/or throughput models. In some embodiments, the service may support a committed work throughput offering and/or a best effort offering. In some embodiments, a committed work throughput level may be specified in terms of a measure of normalized, logical work units (or logical service request units) over time, and may represent a work throughput level that is guaranteed by the system. For example, in systems that provide database or data storage services (e.g., in tables maintained on behalf of clients), a storage service client (e.g., a client application, user, or subscriber having access to the service) may specify a preference between multiple throughput options that are offered by the service, according to a variety of business models, subscription types, and/or payment models. For example, the client/user may indicate a preferred throughput model for a particular table through a parameter of a request to create the table, in some embodiments. In other embodiments, a client/user may specify a default throughput model for all tables created and maintained on their behalf by the data storage service. By supporting both a committed throughput model and a best effort throughput model (for which no throughput guarantees are made), the system may allow clients/users to make a trade-off between performance and cost, according to their needs and/or budgets. Other types of services may support a committed work throughput model and/or other throughput models.

A data storage service (and underlying system) that provides a committed throughput offering may be configured to pre-allocate capacity and/or resources for the creation, growth, and management of a table maintained on behalf of a client/user in response to traffic directed to the table, and not to overbook the resources and/or capacity of the storage node(s) on which that table is maintained. In some embodiments, tables maintained by the service (and underlying system) under a committed throughput model may be maintained in faster (and often more expensive) storage resources, such as high performance media (e.g., flash memory or Solid State Drive, or SSD, media), in order to provide extremely low latencies when servicing requests from the client/user. For example, the system may provide (and dedicate) a high ratio of fast/local memory to main (e.g., disk) memory for the maintenance of those tables (and various partitions thereof). While the storage resources allocated to a given table under a committed throughput model may in some cases be underutilized (at least some of the time), the client/user may value the predictable performance afforded by the committed throughput model more than the additional (and in some cases wasted) costs of dedicating more resources than may always be necessary for that table. Similarly, resources that are pre-allocated to other types of services to support a committed work throughput model may in some cases be underutilized (at least some of the time), but may provide the client/user with a predictable level of performance (e.g., in terms of availability and/or responsiveness).

As described herein, in some embodiments the systems described herein may support both a multi-tenant model and a single-tenant model. In such some embodiments, the client/user may indicate a preferred one of these tenancy models for a particular table through a parameter of a request to create the table. In other embodiments, a client/user may specify a default or initial tenancy model for all tables created and maintained on their behalf by the data storage service.

Figure 4A:
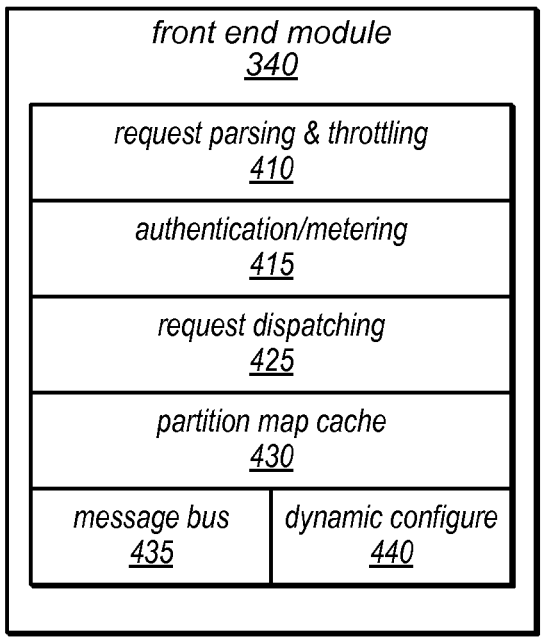
FIGS. 4A-4C are block diagrams illustrating various components of a Web services platform, according to one embodiment.
Figure 4B:
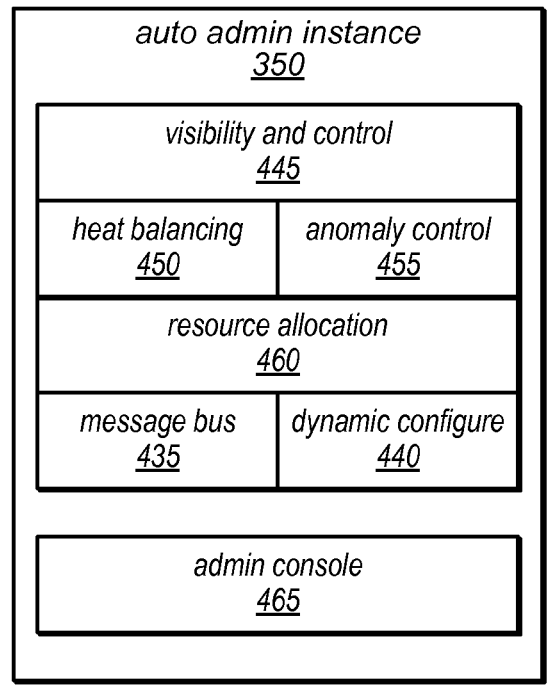
Figure 4C:
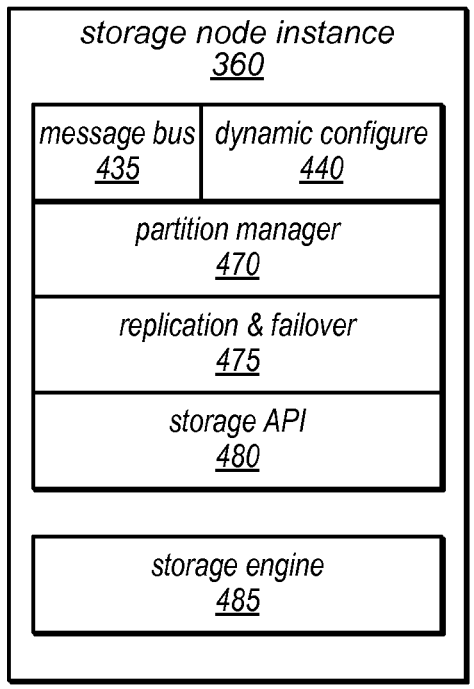

FIGS. 4A-4C illustrate various elements or modules that may be included in each of the types of components of Web services platform 330, according to one embodiment. As illustrated in FIG. 4A, front end module 340 may include one or more modules configured to perform parsing and/or throttling of service requests (shown as 410), authentication and/or metering of service requests (shown as 415), dispatching service requests (shown as 425), and/or maintaining a partition map cache (shown as 430). In addition to these component-specific modules, front end module 340 may include components that are common to multiple types of computing nodes that collectively implement Web services platform 330, such as a message bus (shown as 435) and/or a dynamic configuration module (shown as 440). In other embodiments, more, fewer, or different elements may be included in front end module 340, or any of the elements illustrated as being included in front end module 340 may be included in another component of Web services platform 330 or in a component configured to interact with Web services platform 330 to provide the data storage services described herein.

As illustrated in FIG. 4B, auto admin instance 350 may include one or more modules configured to provide visibility and control to system administrators (shown as 445), or to perform heat balancing (shown as 450), and/or anomaly control (shown as 455), resource allocation (shown as 460). Auto admin instance 350 may also include an admin console 465, through which system administrators may interact with the data storage service (and/or the underlying system). In some embodiments, admin console 465 may be the primary point of visibility and control for the data storage service (e.g., for configuration or reconfiguration by system administrators). For example, admin console 465 may be implemented as a relatively thin client that provides display and control functionally to system administrators and/or other privileged users, and through which system status indicators, metadata, and/or operating parameters may be observed and/or updated. In addition to these component-specific modules, auto admin instance 350 may also include components that are common to the different types of computing nodes that collectively implement Web services platform 330, such as a message bus (shown as 435) and/or a dynamic configuration module (shown as 440). In other embodiments, more, fewer, or different elements may be included in auto admin instance 350, or any of the elements illustrated as being included in auto admin instance 350 may be included in another component of Web services platform 330 or in a component configured to interact with Web services platform 330 to provide the data storage services described herein.

As illustrated in FIG. 4C, storage node instance 360 may include one or more modules configured to provide partition management (shown as 470), to implement replication and failover processes (shown as 475), and/or to provide an application programming interface (API) to underlying storage (shown as 480). As illustrated in this example, each storage node instance 360 may include a storage engine 485, which may be configured to maintain (i.e. to store and manage) one or more tables (and associated table data) in storage 480 (which in some embodiments may be a non-relational database) on behalf of one or more clients/users. In addition to these component-specific modules, storage node instance 360 may include components that are common to the different types of computing nodes that collectively implement Web services platform 330, such as a message bus (shown as 435) and/or a dynamic configuration module (shown as 440). In other embodiments, more, fewer, or different elements may be included in storage node instance 360, or any of the elements illustrated as being included in storage node instance 360 may be included in another component of Web services platform 330 or in a component configured to interact with Web services platform 330 to provide the data storage services described herein.

Note that in some embodiments, it may not be necessary to perform some or all of the throttling, authentication, and/or metering operations that would typically be provided by front end module 340 in multi-tenant environments for tables operating in a single-tenant environment. For example, the system may be configured to elide these operations when servicing requests directed to tables in a single-tenant environment, but to perform them when servicing requests directed to tables in a multi-tenant environment. Similarly, in some embodiments, some of the operations illustrated as being performed by auto admin instance 350 (e.g., heat balancing and/or resource allocation) may or may not be applied in managing tables in a single-tenant environment. However, other operations illustrated as being performed by auto admin instance 350 (or various modules thereof) may be applied in the creation and/or management of tables in both multi-tenant and single-tenant environments.

The systems underlying the database or data storage service described herein may store data on behalf of storage service clients (e.g., client applications, users, and/or subscribers) in tables containing items that have one or more attributes. In some embodiments, the data storage service may present clients/users with a data model in which each table maintained on behalf of a client/user contains one or more items, and each item includes a collection of attributes. The attributes of an item may be a collection of name-value pairs, in any order. In some embodiments, each attribute in an item may have a name, a type, and a value. Some attributes may be single valued, such that the attribute name is mapped to a single value, while others may be multi-value, such that the attribute name is mapped to two or more values. In some embodiments, the name of an attribute may always be a string, but its value may be a string, number, string set, or number set. The following are all examples of attributes: "ImageID"=1, "Title"="flower", "Tags"={"flower", "jasmine", "white"}, "Ratings"={3, 4, 2}. The items may be managed by assigning each item a primary key value (which may include one or more attribute values), and this primary key value may also be used to uniquely identify the item. In some embodiments, a large number of attributes may be defined across the items in a table, but each item may contain a sparse set of these attributes (with the particular attributes specified for one item being unrelated to the attributes of another item in the same table), and all of the attributes may be optional except for the primary key attribute(s). In other words, unlike in traditional databases, the tables maintained by the database or data storage service (and the underlying storage system) may have no predefined schema other than their reliance on the primary key. Note that in some embodiments, if an attribute is included in an item, its value cannot be null or empty (e.g., attribute names and values cannot be empty strings), and, and within a single item, the names of its attributes may be unique.

In some embodiments, the systems described herein may employ a somewhat limited indexing and/or query model in order to provide massive (i.e. virtually unlimited) scaling, predictability, and simplicity for users/subscribers or client applications. For example, in some embodiments, data may be indexed and partitioned (e.g., partitioned in the underlying database) by a primary key only. In such embodiments, the primary key to be used for indexing data in a user table may be specified by the user at the time that the table is created on the user's behalf. Thereafter, the partitioning of the user's data may be handled by the system, and abstracted from the user. In some embodiments, the primary key used for indexing data may consist of a single attribute hash key. In other embodiments, the primary key used for indexing and/or partitioning data may be a composite key comprising a hash key component and another component, sometimes referred to herein as a range key component. In various embodiments, queries may be supported against indexed attributes, and a full table scan function may be provided (e.g., to support troubleshooting). In some embodiments, users may define secondary indexes for a table based on one or more attributes other than those of the primary key, and then may query for items using the indexes they have defined. For example, in some embodiments the system may support the creation of creating secondary indexes on-the-fly (e.g., using a createIndex API), and these secondary indexes may scale automatically based on storage requirements (e.g., increasing or decreasing data volume) and/or read/write traffic. In some embodiments, such secondary indexes may be asynchronously updated as items in the table are updated.

In various embodiments, the service (and/or the underlying system) may enforce pre-determined size limits on table names, items, attribute values, primary key values, and/or attribute names. For example, in some embodiments, the total size of all the attribute names and values in an item (i.e. the row size) may be limited.

The database and data storage services described herein (and/or the underlying system) may provide an application programming interface (API) for requesting various operations targeting tables, items, and/or attributes maintained on behalf of storage service clients. In some embodiments, the service (and/or the underlying system) may provide both control plane APIs and data plane APIs. The control plane APIs provided by the data storage service (and/or the underlying system) may be used to manipulate table-level entities, such as tables and indexes. These APIs may be called relatively infrequently (when compared to data plane APIs). In some embodiments, the control plane APIs provided by the service may be used to create tables, delete tables, and/or describe tables. In some embodiments, control plane APIs that perform updates to table-level entries may invoke asynchronous workflows to perform a requested operation. Methods that request "description" information (e.g., via a describeTables API) may simply return the current known state of the tables maintained by the service on behalf of a client/user. The data plane APIs provided by the data storage service (and/or the underlying system) may be used to perform item-level operations, such as storing, deleting, retrieving, and/or updating items and/or their attributes, or performing index-based search-type operations across multiple items in a table, such as queries and scans.

The APIs provided by the service described herein may support request and response parameters encoded in one or more industry-standard or proprietary data exchange formats, in different embodiments. For example, in various embodiments, requests and responses may adhere to a human-readable (e.g., text-based) data interchange standard, (e.g., JavaScript Object Notation, or JSON), or may be represented using a binary encoding (which, in some cases, may be more compact than a text-based representation). In various embodiments, the system may supply default values (e.g., system-wide, user-specific, or account-specific default values) for one or more of the input parameters of the APIs described herein.

As noted above, the control plane APIs supported by the service may include APIs that perform updates on tables (e.g., a CreateTable API and/or a DeleteTable API). In various embodiments, these APIs may invoke asynchronous workflows to perform the requested operation. In addition, the service may support methods that return the current known state (e.g., a DescribeTables API). In some embodiments, a common use model may be for a client to request an action (e.g., using a CreateTable API), and then to poll on its completion via the corresponding description API (e.g., DescribeTables).

In some embodiments in which the system provides database or data storage services to clients, the system may provide an application programming interface (API) that includes support for some or all of the following operations on data maintained in a table by the service on behalf of a storage service client: put (or store) an item, get (or retrieve) one or more items having a specified primary key, delete an item, update the attributes in a single item, query for items using an index, and scan (e.g., list items) over the whole table, optionally filtering the items returned. For example, the data storage service (and/or underlying system) described herein may provide various data plane APIs for performing item-level operations, such as a PutItem API, a GetItem (or GetItems) API, a DeleteItem API, and/or an UpdateItem API, as well as one or more index-based seek/traversal operations across multiple items in a table, such as a Query API and/or a Scan API Note that the amount of work required to satisfy service requests that specify these operations may vary depending on the particular operation specified and/or the amount of data that is accessed and/or transferred between the storage system and the client in order to satisfy the request.

In some embodiments, the system described herein may be configured to create and execute a database instance in a single-tenant environment on dedicated hardware (e.g., on a dedicated storage device) or on particular ones of the storage nodes in the system. In other embodiments, a database instance in a single-tenant environment may be created and may execute on a different virtual machine in a storage node than other database instances that are created and that execute on the same storage node. In some embodiments, the underlying software and/or hardware to implement the functionality for performing database operations that target tables in both types of environments (e.g., operations to store, retrieve, or delete data) may be the same (or substantially similar). However, since clients may be able to directly connect to database instances (and/or tables therein) in the single-tenant environment, there may not be a need for the system to provide an intermediate layer to provide security or other utilities required to support multi-tenancy. Instead, authentication checks may be skipped and clients may submit requests to perform operations on these tables directly to the underlying storage node(s), e.g., on a low-latency path.

For example, in some embodiments, a client may submit a request to create a database instance (e.g., using a CreateDatabaseInstance API), and may submit a request for a description of a database instance (e.g., using a DescribeDatabaseInstance API), in response to which, the system may return a list of IP addresses at which the client may directly connect to the database instance (or a table therein)

to perform various operations (e.g., create table, put item, get item, etc.). In general, a database instance in a multi-tenant environment may store tables for multiple different customers that all run within the same database instance. Therefore, the system may be required to keep clients from being able to access each other's tables using various security and authentication schemes. However, with a dedicated database instance in a single-tenant environment, the client may be given a specific IP address for the specific database instance, after which the client may configure a firewall group or another type of security group to limit the clients that are able to connect to that instance and/or create their own network connection to their table(s), e.g., a TCP connection that conforms to one of various open source protocols, in some embodiments.

Figure 5:
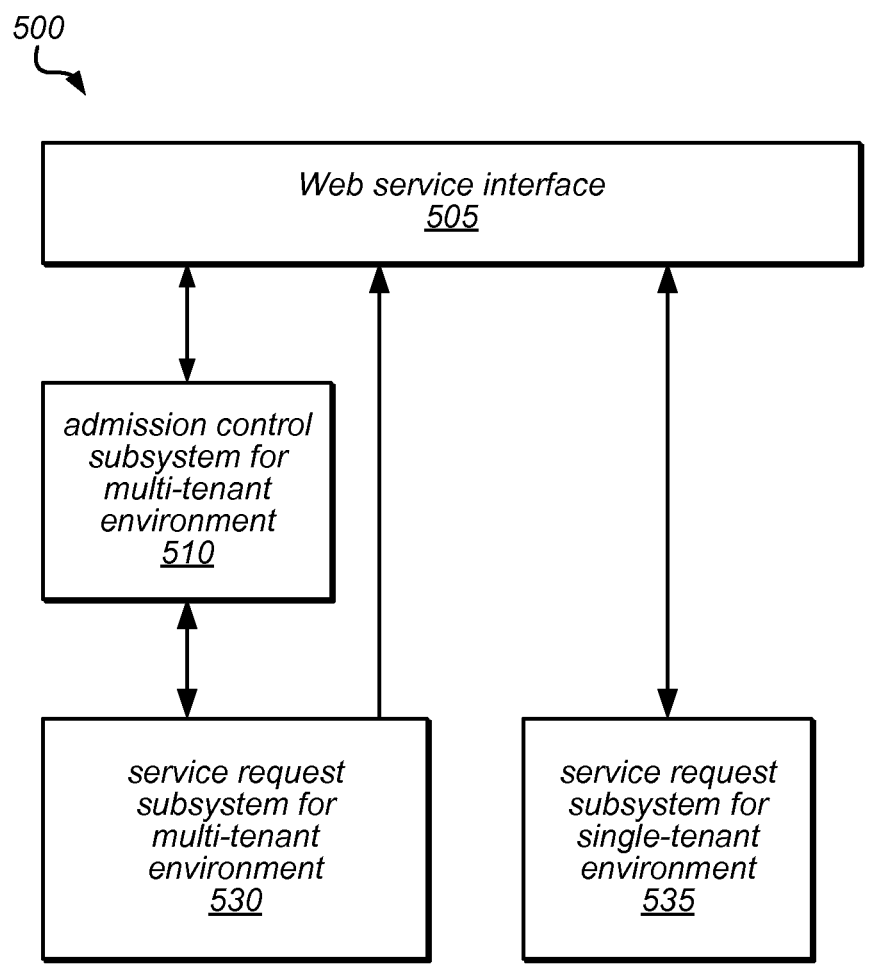
FIG. 5 is a block diagram illustrating subsystems of a system that provides various Web-based services to clients, according to one embodiment.

FIG. 5 is a block diagram illustrating a computing system 500 that provides various Web-based services to clients, according to some embodiments. For example, in some embodiments, computing system 500 may implement a Web server, such as Web services platform 330 illustrated in FIG. 3. In various embodiments, computer system 500 may be configured to allocate a variety of resources (which may include, for example, downstream services, database connections, input/output channels, computational resources, execution threads, a portion of system memory, disk memory or other persistent storage resources, or any other constrained resources) from one or more pools of resources to service requests received by computing system 500 in order to provide services requested by various clients. For example, in order to satisfy a service request directed to a data storage system, the data storage system may allocate one or more database connections, input/output channels, storage resource portions and/or other resources for each normalized, logical work unit or logical service request unit required to satisfy the request. As illustrated in this example, computing system 500 may include a Web service interface 505, an admission control subsystem 510 for use in a multi-tenant environment, a service request subsystem 530 for managing requests directed to tables in a multi-tenant environment, and a service request subsystem 535 for managing requests directed to tables in a single-tenant environment.

In this example, Web services interface 505 may be configured to receive requests for services from various clients and to communicate with admission control subsystem 510 to facilitate the performance of those services on behalf of the clients. For example, in some embodiments, admission control subsystem 510 may be configured to determine which and/or how many service requests that are directed to tables in a multi-tenant environment to accept from various clients, and may communicate with a service request subsystem 530 to accept and/or service one or more received service requests. In some embodiments, admission control subsystem 510 may be configured to determine which and/or how many service requests to accept dependent on a maximum request rate for the system and/or for a particular client, application, target, request type, or operation. As described herein, the maximum request rate may be dynamically adjusted dependent on the current work throughput rate and/or a target or committed work throughput rate. In other embodiments, service requests may be managed using work-based tokens. In various embodiments, admission control subsystem 510 may implement one or more admission control mechanisms, including any admission control mechanism suitable for managing service requests that have non-uniform workloads.

In some embodiments, if a service request is accepted for servicing by admission control subsystem 510, service request subsystem 530 may in turn be configured to allocate (or initiate allocation of) one or more resources needed to perform the requested services to those requests, and/or to return results to the client via Web services interface 505. For example, in embodiments in which the system provides data storage services, in response to a query request that is accepted by admission control subsystem 510, service request subsystem 530 may access the table to which the query is directed and may return the query results to the client via Web services interface 505. In some embodiments, admission control subsystem 510 may be configured to throttle and otherwise manage service requests that have non-uniform workloads (e.g., adjusting a maximum request rate dependent on a current work throughput rate. In other embodiments, this functionality may be provided by another component of the system, which may provide the maximum request rate to the admission control subsystem for use in throttling service requests. In some embodiments, admission control subsystem 510 may implement a "leaky bucket" based admission controller. In some embodiments, Web service interface 505 may utilize predefined instructions or communications, such as via defined application protocol interfaces (APIs), to communicate with admission control subsystem 510 and/or other components of computing system 500 on behalf of a client.

In this example, service request subsystem 535 may be configured to allocate (or initiate allocation of) one or more resources needed to perform requested services that are directed to tables in a single-tenant environment, and/or to return results to the client via Web services interface 505, without performing all of the operations described above as being performed by admission control subsystem 510. For example, in embodiments in which the system provides database or data storage services for tables in a single-tenant environment, in response to a query request, service request subsystem 535 may access the table to which the query is directed and may return the query results to the client via Web services interface 505.

Note that in various embodiments, the components illustrated in FIGS. 4A-4C and/or 5 may be implemented directly within computer hardware, as instructions directly or indirectly executable by computer hardware (e.g., a microprocessor or computer system), or as a combination of these techniques. For example, the components of the computing system 500 may be implemented by a distributed system including any number of computing nodes (or simply, nodes). In various embodiments, the functionality of a given component may be implemented by a particular node or distributed across several nodes. In some embodiments, a given node may implement the functionality of more than one of the component illustrated in FIGS. 4A-4C and/or 5.

Various techniques that may be implemented by a Web server (or an admission control subsystem or other component thereof) are described in more detail below, according to different embodiments. In general, any or all of the techniques described herein for managing the processing of service requests on behalf of clients may be performed by and/or implemented in an admission control module that is a component of a Web server. While several examples described herein are directed to systems that provide services over the Internet, in other embodiments, these techniques may be performed by and/or implemented in an admission control module or a similar component of another type of system that provides services to clients, and that is configured to receive, accept, and/or service requests on behalf of those clients.

As previously noted, in some embodiments, a database system supports both a multi-tenant model and a single-tenant model may allow a customer to choose which way they want to have their tables set up. In addition, in some embodiments, if a table is initially set up in a multi-tenant environment (e.g., in an attempt to keep costs low), if the client later requires (or desires) higher throughput for all (or a portion) or the table, the table (or the hot portion thereof), may be moved to a single-tenant environment, which may provide higher throughput. For example, when data in a table is being accessed at a high rate (or is expected to be accessed at a high rate), the client may request (or the system may automatically perform) creating a snapshot of the table (or a portion of the table that is being accessed at a high rate) data and moving that table (or portion of the table) to a single-tenant environment. In this example, if, at some point in the future, the table (or portion of the table that was moved) is no longer being accessed at a high rate, the client may request (or the system make automatically perform) moving it back to the multi-tenant environment. In general, tables created in the systems described herein may be moved in either direction between a multi-tenant environment and a single-tenant environment as desired (e.g., dependent on the workload, the desired throughput, the cost, various system policies or service agreements, or on other factors).

Note that although a single client may store some portions of their data in tables in a multi-tenant environment and other portions of their data in tables in a single-tenant environment, in some embodiments, a client may only be able to split their data between these two tenancy models on a per-table basis. In other words, a client may be able to store some tables in a multi-tenant environment and other tables in a single-tenant environment, but may not be able to split a table between the two environments unless the table itself is first split into multiple tables, each of which is to be stored under one of these environment models. In one example, if the capacity of database instances in a single-tenant environment is 100 GBytes (e.g., if this is the maximum size database instance that could be supported in the single-tenant model) and a client wishes to create a store 120 GBytes of data, the client may carve off 100 GBytes and put it in a table in a single-tenant environment, and may put (or leave) the remaining 20 GBytes in a table in a multi-tenant environment.

Figure 6:
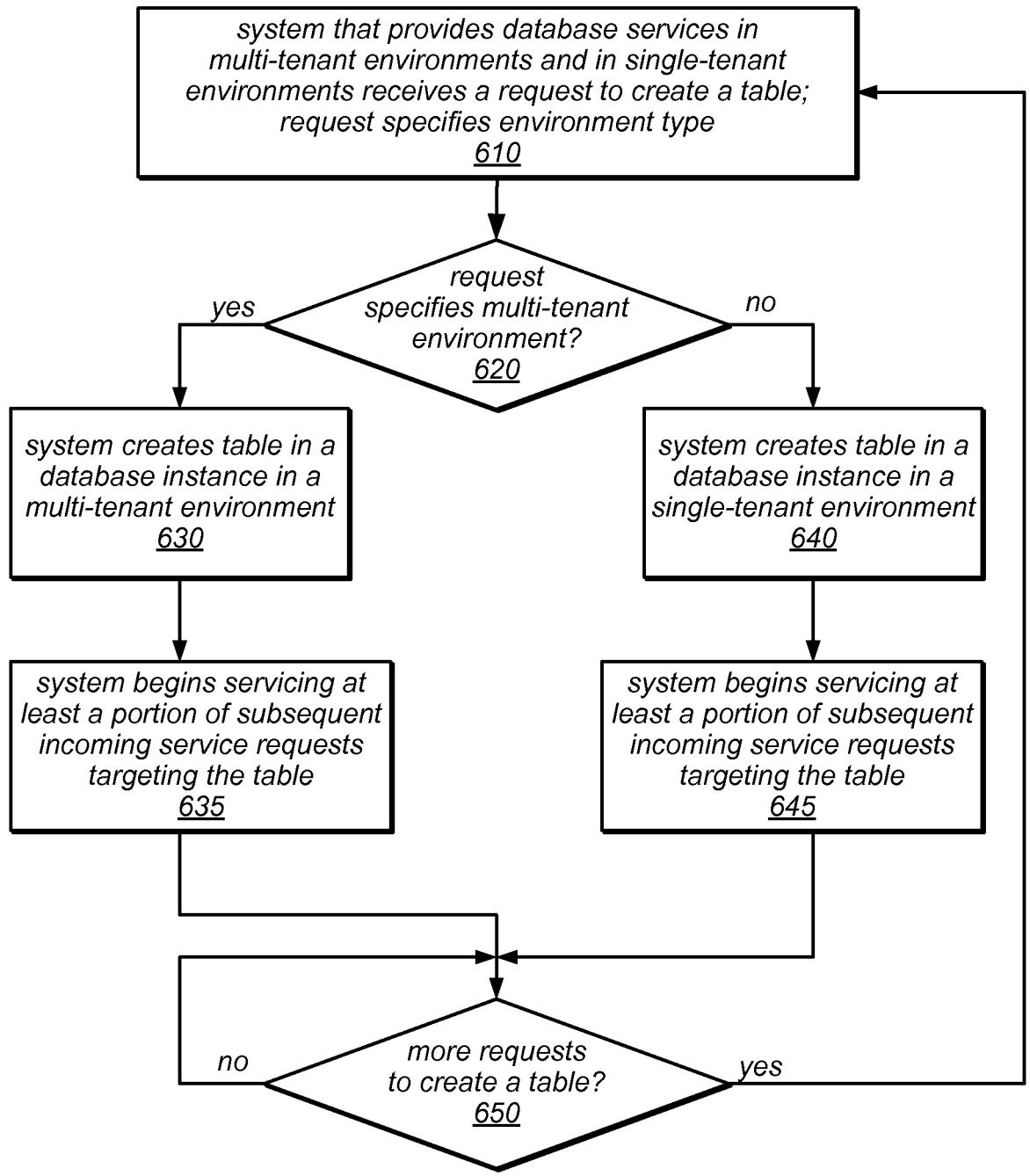
FIG. 6 is a flow diagram illustrating one embodiment of a method for creating a table in a system that provides database instances in a multi-tenant environment and database instances in a single-tenant environment.

One embodiment of a method for creating a table in a system that provides database instances in a multi-tenant environment and database instances in a single-tenant environment is illustrated by the flow diagram in FIG. 6. As illustrated at 610, in this example, the method may include a system that provides database services in multi-tenant environments and in single-tenant environments receiving a request to create a table, and the request may specify an environment type (e.g., multi-tenant or single-tenant). If the request specifies that the table should be created in a multi-tenant environment (shown as the positive exit from 620), the method may include the database system creating a table in a database instance in a multi-tenant environment, as in 630. The system may then begin servicing at least a portion of incoming service requests that are subsequently received and that target the table, as in 635.

If the request does not specify that the table should be created in a multi-tenant environment (shown as the negative exit from 620), the method may include the database system creating a table in a database instance in a single-tenant environment, as in 640. The system may then begin servicing at least a portion of incoming service requests that are subsequently received and that target the table, as in 645. If more requests to create a table are received (shown as the positive exit from 650), the method may include repeating the operations illustrated in FIG. 6 for each additional request (shown as the feedback from the negative exit of 650 to 610).

Figure 7:
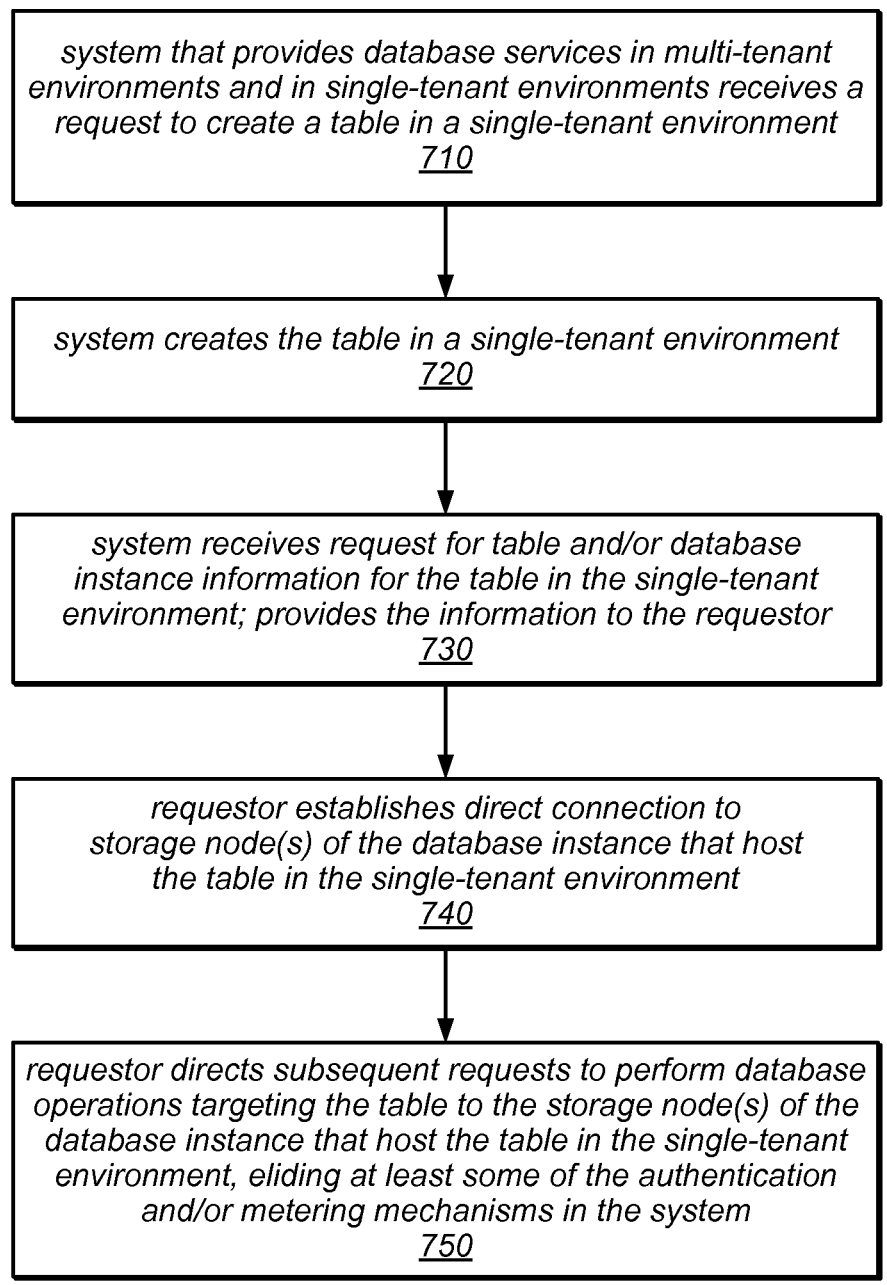
FIG. 7 is a flow diagram illustrating one embodiment of a method for creating and accessing a table in a database instance in a single-tenant environment.

As previously noted, the database system may be configured to perform different operations when servicing requests to perform database operations that target tables in a single-tenant environment than when servicing requests to perform database operations that target tables in a multi-tenant environment. One embodiment of a method for creating and accessing a table in a database instance in a single-tenant environment is illustrated by the flow diagram in FIG. 7. As illustrated in this example, the method may include a system that provides database services in multi-tenant environments and in single-tenant environments receiving (e.g., from a client) a request to create a table in a single-tenant environment, as in 710. In response, the database system may create the table in a single-tenant environment, as in 720. Creating the table may include provisioning resources (including, e.g., portions of one or more storage nodes) for the table in a database instance in a single-tenant environment, and may also include configuring the table according to configuration parameter values included in the request and/or populating the table with table data received as part of the request to create the table, in some embodiments. As illustrated in this example, the method may include the database system receiving a request for table and/or database instance information for the table in the single-tenant environment (e.g., information that will allow the client to establish a direct connection to the table on the storage node or nodes on which it is hosted) and providing that information to the requestor, as in 730. For example, in some embodiments, in response to such a request, the database system may return an IP address for the table to the client.

As illustrated in this example, the method may include the requestor (client) establishing a direct connection to the storage node(s) of the database instance that host the table in the single-tenant environment, as in 740. Subsequently, the requestor (client) may direct requests to perform database operations targeting the table to the storage node(s) of the database instance that host the table in the single-tenant environment for servicing (over the established direct connection), as in 750. As illustrated in this example, servicing requests to perform database operations on a table that is hosted in a single-tenant environment may include eliding at least some of the authentication and/or metering mechanisms in the system (e.g., authentication and/or metering mechanisms that may be performed when servicing requests directed to tables hosted in a multi-tenant environment), as in 750. For example, since (at least in some embodiments) there would be no tables hosted on behalf of other clients in the same database instance as a table that is hosted in a single-tenant environment and no database resources shared between tables of different clients, and since the client on whose behalf a table is hosted in the single-tenant environment may communicate with the table over a direct connection, there may be no need to perform some of the authentication and/or metering operations that enforce isolation between client tables or enforce pre-determined limits on accesses to the table in a multi-tenant environment.

Figure 8:
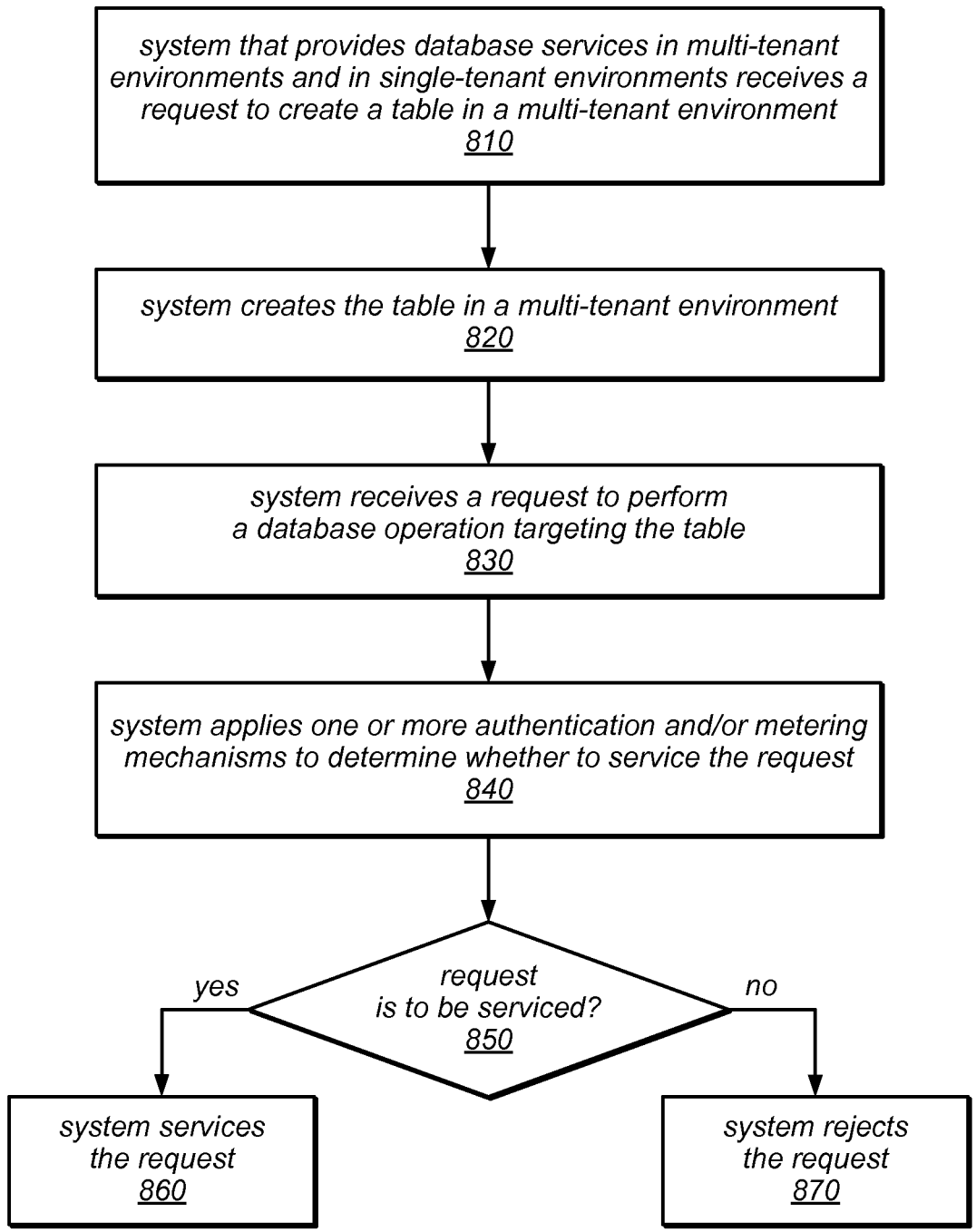
FIG. 8 is a flow diagram illustrating one embodiment of a method for illustrating one embodiment of a method for creating and accessing a table in a database instance in a multi-tenant environment.

One embodiment of a method for illustrating one embodiment of a method for creating and accessing a table in a database instance in a multi-tenant environment is illustrated by the flow diagram in FIG. 8. As illustrated at 810, in this example, the method may include a system that provides database services in multi-tenant environments and in single-tenant environments receiving a request to create a table in a multi-tenant environment. In response to the request, the database system may create the table in a multi-tenant environment, as in 820. Creating the table may include provisioning resources (including, e.g., portions of one or more storage nodes) for the table in a database instance in a multi-tenant environment, and may also include configuring the table according to configuration parameter values included in the request and/or populating the table with table data received as part of the request to create the table, in some embodiments. As previously noted, a table hosted in a multi-tenant environment on behalf of a client may be hosted in a database instance that also hosts one or more tables on behalf of other clients.

As illustrated in FIG. 8, the method may include the database system receiving a request to perform a database operation that targets the table, as in 830. In response, the system may apply one or more authentication and/or metering mechanisms to determine whether to service the request, as in 840. If the request is to be serviced (shown as the positive exit from 850), the method may include the system servicing the request, as in 860. Otherwise (shown as the negative exit from 850), the system may reject the request (as in 870). For example, if the request cannot be authenticated or if the client has exceeded a pre-determined throughput limit, the request may be rejected.

As previously noted, in some cases, it may be desirable (e.g., from a performance or cost standpoint) to move a table from a single-tenant environment to a multi-tenant environment. Moving a table to a different environment may in some embodiments include not only involve moving the underlying storage nodes to a different environment. For example, to move a table that is in a multi-tenant environment, the client (or the system) may access one or more data files for particular multi-tenant storage nodes (each of which may store a portion of the table), snapshot them (e.g., to a key-value storage system), create a dedicated database instance (e.g., a database instance in a single-tenant environment), and copy the data files from the snapshot to the newly created dedicated database instance (which may be similar in effect to "restoring" the table from the snapshot to the new database instance) Similarly, moving a table from a single-tenant environment to a multi-tenant environment may include taking a snapshot of the table (e.g., to a key-value storage system) and then "restoring" the table from the snapshot to a database instance in a multi-tenant environment (which may include creating a database instance in the multi-tenant environment, if one does not already exist).

In a more specific example, a database service that hosts order data on behalf of a client may be configured to store the most recent order data (e.g., each week's worth of data) in a separate table in a single-tenant database instance, and later (e.g., once the order data in a table is more than one week old), to move that table to a multi-tenant environment. Because the older order data is less likely to be accessed than the more recent order data (therefore a high throughput dedicated instance may not be required), it may be more cost effective to store it in the multi-tenant environment. In some embodiments, much older data (e.g., data that is months or years old) may be removed from the storage nodes of the database service altogether, at which point it may be archived. In another example, data that is not expected to be accessed frequently may be stored in a multi-tenant environment. However, if accesses to the data spike, the data may be moved to a single-tenant environment, at least for the duration of the increased demand for throughput.

As noted above, in some embodiments, a database system may be configured to initially create all tables in either a multi-tenant environment or in a single-tenant environment by default, but may support moving the table to the other type of environment later. One embodiment of a method for creating a table in a multi-tenant environment and moving it to a single-tenant environment is illustrated by the flow diagram in FIG. 9. As illustrated at 910, in this example, the method may include a system that provides database services in multi-tenant environments and in single-tenant environments receiving a request to create a table. In this example, in response to the request, the database system may create the table in a multi-tenant environment (e.g., by default), as in 920. As illustrated at 930, the method may include the database system receiving and servicing at least some of one or more requests to perform database operations that target the table, which may include applying one or more authentication and/or metering mechanisms to the requests, as described above.

Figure 9:
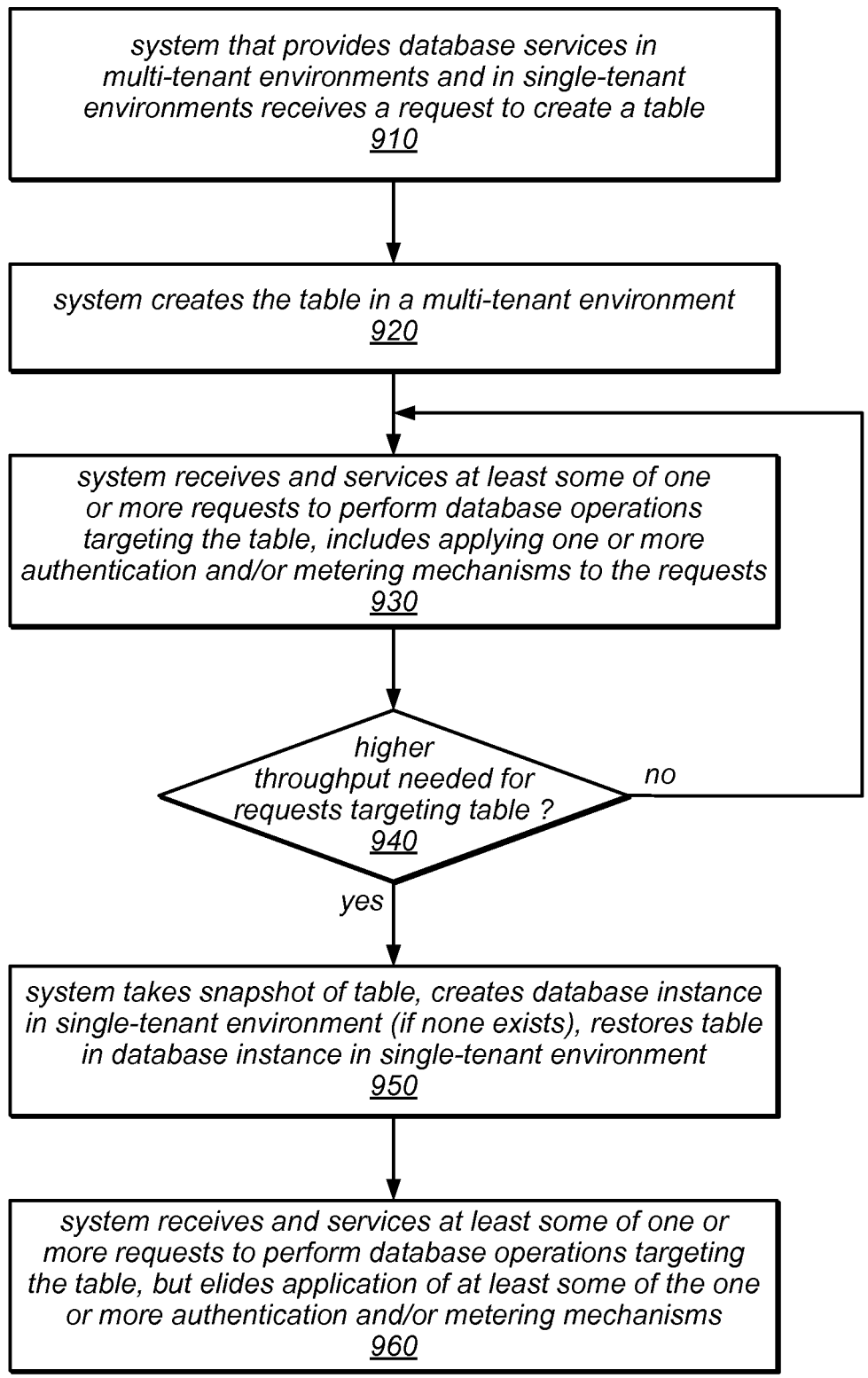
FIG. 9 is a flow diagram illustrating one embodiment of a method for creating a table in a multi-tenant environment and moving it to a single-tenant environment.

In this example, if (at any point in the future) it is determined that the throughput provided by the table in the multi-tenant environment is sufficient for handling requests targeting the table (shown as the negative exit from 940), the method may include continuing to host the table in the multi-tenant environment and receiving and servicing requests directed to the table according to the protocols of the multi-tenant environment. This is illustrated in FIG. 9 by the feedback from the negative exit of 940 to 930. If, on the other hand, it is determined that a higher throughput is needed (or desired) for requests targeting the table (shown as the positive exit from 940), the method may include the database system taking a snapshot of the table, creating a database instance in single-tenant environment (if none exists), and "restoring" the table from the snapshot as a new table in the database instance in the single-tenant environment, as in 950. For example, in some embodiments, the database system may be configured to determine, based on the observed workload directed to the table (and/or other tables hosted in the same database instance) and/or the observed throughput being experienced by the table, that the table should be moved to a single-tenant environment to improve performance (e.g., according to various system policies and/or applicable service level agreements). In other embodiments, a client wishing to improve performance of their application by increasing the throughput for service requests directed to the table may explicitly request that the table be moved to a single-tenant environment (e.g., using a request message communicated to the system using a graphical user interface, or by invoking the move programmatically, as defined by an API). As illustrated in this example, subsequent to the move, the method may include the database system receiving and servicing at least some of one or more additional requests to perform database operations targeting the table, but the system may elide the application of at least some of the one or more authentication and/or metering mechanisms that would be applied to tables hosted in a multi-tenant environment (as in 960).

Figure 10:
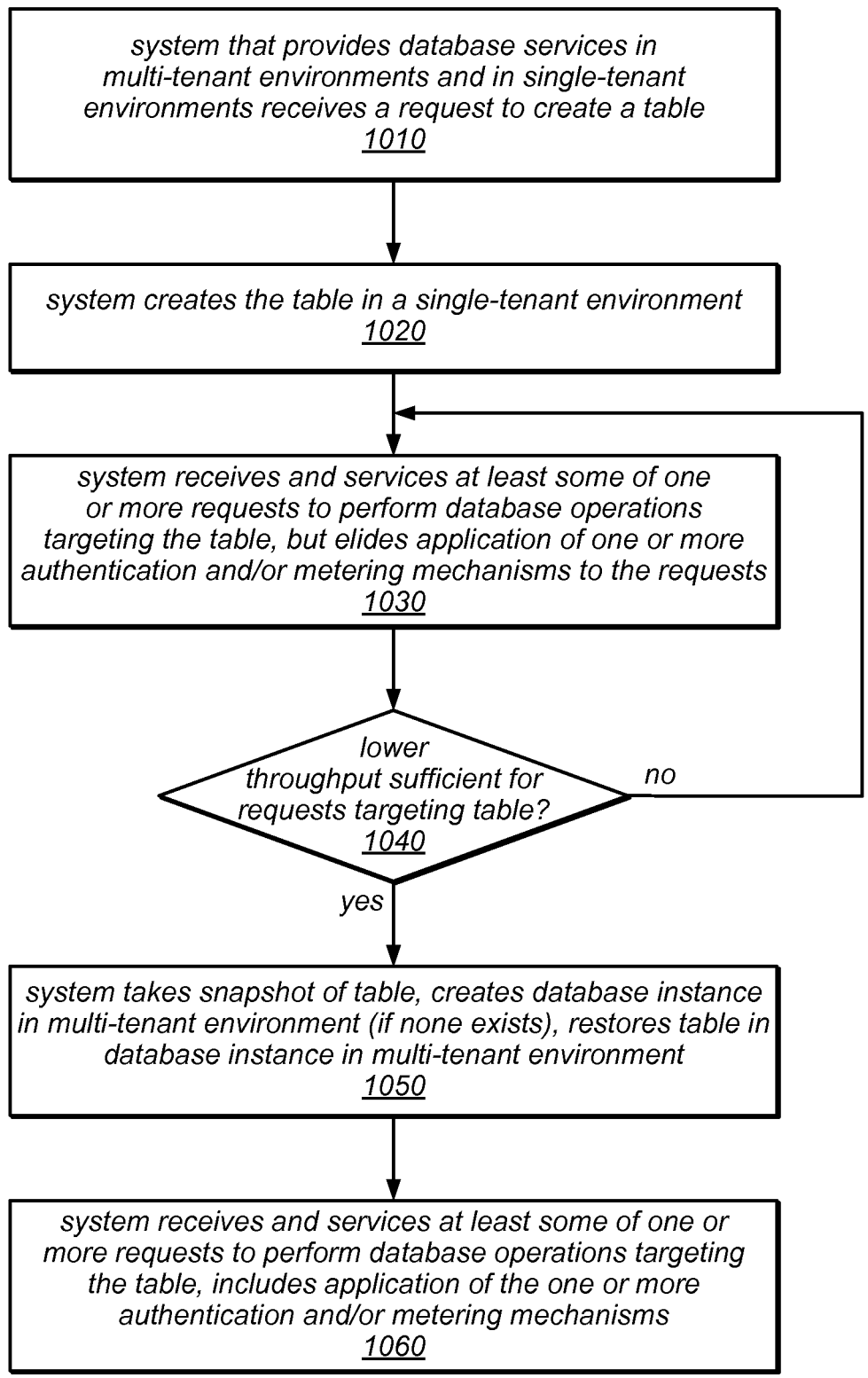
FIG. 10 is a flow diagram illustrating one embodiment of a method for creating a table in a single-tenant environment and moving it to a multi-tenant environment.

One embodiment of a method for creating a table in a single-tenant environment and moving it to a multi-tenant environment is illustrated by the flow diagram in FIG. 10. As illustrated at 1010, in this example, the method may include a system that provides database services in multi-tenant environments and in single-tenant environments receiving a request to create a table. In this example, in response to the request, the database system may create the table in a single-tenant environment (e.g., by default), as in 1020. As illustrated at 1030, the method may include the database system receiving and servicing at least some of one or more requests to perform database operations that target the table, during which the system may elide the application of one or more authentication and/or metering mechanisms to the servicing of the requests, as described above.

In this example, if (at any point in the future) it is determined that a lower throughput that would be provided when hosting the table in a multi-tenant environment would be sufficient for requests targeting the table (shown as the positive exit from 1040), the method may include the database system taking a snapshot of the table, creating a database instance in multi-tenant environment (if none exists), and "restoring" the table from the snapshot as a new table in the database instance in the multi-tenant environment, as in 1050. For example, in some embodiments, the database system may be configured to determine, based on an observed, expected, and/or desired workload directed to the table and/or the observed throughput being experienced by the table, that the table should be moved to a multi-tenant environment to reduce costs (e.g., according to various system policies and/or applicable service level agreements). In other embodiments, a client wishing to reduce the cost of managing the table by accepting a reduced throughput for service requests directed to the table may explicitly request that the table be moved to a multi-tenant environment (e.g., using a request message communicated to the system using a graphical user interface, or by invoking the move programmatically, as defined by an API). As illustrated in this example, subsequent to the move, the method may include the database system receiving and servicing at least some of one or more additional requests to perform database operations targeting the table, which may include performing at least some of the one or more authentication and/or metering mechanisms that are elided when servicing requests directed to tables hosted in a single-tenant environment (as in 1060).

On the other hand, if it is determined that the throughput provided by the table in a multi-tenant environment would not be sufficient for handling requests targeting the table (shown as the negative exit from 1040), the method may include continuing to host the table in the single-tenant environment and receiving and servicing requests directed to the table according to the protocols of the single-tenant environment. This is illustrated in FIG. 10 by the feedback from the negative exit of 1040 to 1030.

Note that in some embodiments, database instance that are created in a single-tenant environment may automatically scale up and down (employing more or fewer underlying storage nodes and/or database instances that store replicas of the table as needed), just as database instances that are created in a multi-tenant environment do. In other words, as the client adds more data, the database instance automatically scales. Note that, in some embodiments, there may be no fixed relationship between a particular database instance and the one or more storage nodes that are used to implement it. Note also that a database instance created by a particular client in a single-tenant environment may be striped in such a way that it corresponds to three underlying database instances (e.g., for maintaining three replicas of the data hosted in that instance).

The techniques described above may be suitable for hosting tables and managing service requests directed to those tables in a variety of systems that provide services to clients, in various embodiments. For example, they may be appropriate for hosting tables and managing service requests in systems that experience a wide range of workload behaviors, including relatively high work throughput rates and/or dynamically changing work throughput rates. In some embodiments, there may be a different pricing model for database tables in a single-tenant environment than for database tables of a similar capacity in a multi-tenant environment. For example, pricing under a single-tenant model may be on a per-instance basis, while pricing under a multi-tenant model may be based on throughput.

It is contemplated that in some embodiments, any of the methods, techniques or components described herein may be implemented as instructions and data capable of being stored or conveyed via a computer-accessible medium. Such methods or techniques may include, for example and without limitation, various methods for providing database services in multi-tenant and single-tenant environments, as described herein. Such instructions may be executed to perform specific computational functions tailored to specific purposes (e.g., processing requests received via a Web services interface, or returning feedback and/or results of servicing various requests) as well as higher-order functions such as operating system functionality, virtualization functionality, network communications functionality, application functionality, storage system functionality, and/or any other suitable functions.

Figure 11:
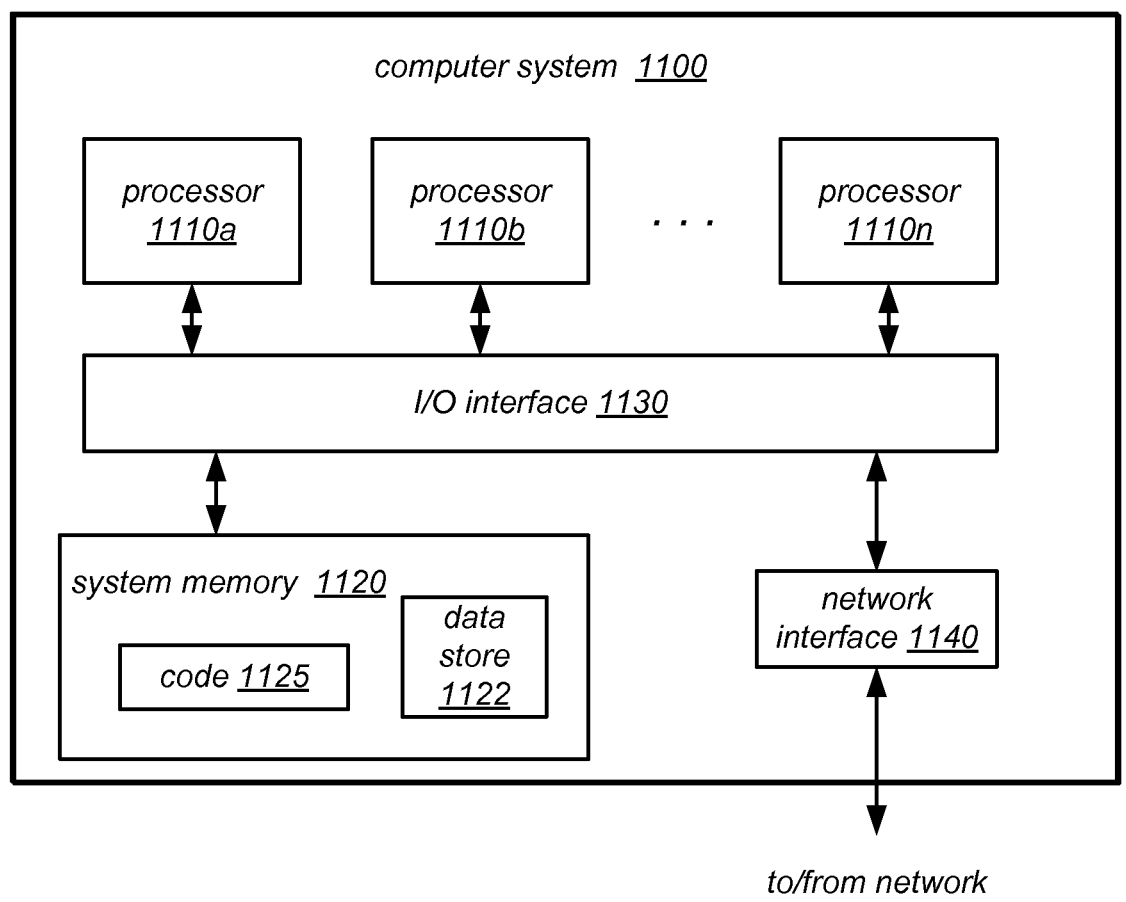
FIG. 11 illustrates one embodiment of a computer system that implements one or more of the techniques described herein for providing database services in multi-tenant and single-tenant environments.

One embodiment of a computer system that implements one or more of the techniques described herein for providing database services in multi-tenant and single-tenant environments is illustrated in FIG. 11. In different embodiments, the functionality of any of the various modules or methods described herein may be implemented by one or several instances of computer system 1100. In particular, it is noted that different elements of the system described herein may be implemented by different computer systems 1100. For example, a computer system that supports the functionality described herein for managing service requests may be implemented on the same computer system 1100 on which a client (through which a customer or subscriber may access the system) executes, or on another computer system 1100, in different embodiments. In another example, different subsystems (e.g., a Web service interface, an admission control subsystem, and a service request subsystem; and/or one or more Web servers or other components) may be implemented on or across multiple ones of the computing nodes, and each of the computing nodes may be similar to computer system 1100.

In the illustrated embodiment, computer system 1100 includes one or more processors 1110 coupled to a system memory 1120 via an input/output (I/O) interface 1130. Computer system 1100 further includes a network interface 1140 coupled to I/O interface 1130. In various embodiments, computer system 1100 may be a uniprocessor system including one processor 1110, or a multiprocessor system including several processors 1110 (e.g., two, four, eight, or another suitable number). Processors 1110 may be any suitable processor capable of executing instructions. For example, in various embodiments processors 1110 may be a general-purpose or embedded processor implementing any of a variety of instruction set architectures (ISAs), such as the x86, PowerPC™, SPARC™, or MIPS™ ISAs, or any other suitable ISA. In multiprocessor systems, each of processors 1110 may commonly, but not necessarily, implement the same ISA.

System memory 1120 may be configured to store instructions (e.g., code 1125) and data (e.g., in data store 1122) accessible by processor 1110. In various embodiments, system memory 1120 may be implemented using any suitable memory technology, such as static random access memory (SRAM), synchronous dynamic RAM (SDRAM), nonvolatile/Flash-type memory, or any other type of memory. In the illustrated embodiment, instructions and data implementing desired functions, methods or techniques (such as functionality for providing database services in multi-tenant and single-tenant environments using any or all of the mechanisms described herein), are shown stored within system memory 1120 as code 1125. It is noted that in some embodiments, code 1125 may include instructions and data implementing desired functions that are not directly executable by processor 1110 but are represented or encoded in an abstract form that is translatable to instructions that are directly executable by processor 1110. For example, code 1125 may include instructions specified in an ISA that may be emulated by processor 1110, or by other code 1125 executable on processor 1110. Alternatively, code 1125 may include instructions, procedures or statements implemented in an abstract programming language that may be compiled or interpreted in the course of execution. As non-limiting examples, code 1125 may include code specified in a procedural or object-oriented programming language such as C or C++, a scripting language such as perl, a markup language such as HTML or XML, or any other suitable language.

In some embodiments, data store 1122 within system memory 1120 may store values of default, system-side, client-specific, or type-specific configurable parameters used in providing database services in multi-tenant and single-tenant environments; observed, sampled, measured, and/or aggregated (e.g., averaged) performance information (including, but not limited to: actual work throughput rates, maximum request rates, actual request rates and/or rejection rates, and/or target or committed work throughput rates); configuration data (e.g., token bucket capacity limits, default token generation rates, default token deduction values, service level agreement parameter values, admission control policy data, and/or client-specific parameter values); and/or other data in various data structures suitable for implementing the techniques described herein.

In one embodiment, I/O interface 1130 may be configured to coordinate I/O traffic between processor 1110, system memory 1120, and any peripheral devices in the device, including network interface 1140 or other peripheral interfaces. In some embodiments, I/O interface 1130 may perform any necessary protocol, timing or other data transformations to convert data signals from one component (e.g., system memory 1120) into a format suitable for use by another component (e.g., processor 1110). In some embodiments, I/O interface 1130 may include support for devices attached through various types of peripheral buses, such as a variant of the Peripheral Component Interconnect (PCI) bus standard or the Universal Serial Bus (USB) standard, for example. In some embodiments, the function of I/O interface 1130 may be split into two or more separate components, such as a north bridge and a south bridge, for example. Also, in some embodiments some or all of the functionality of I/O interface 1130, such as an interface to system memory 1120, may be incorporated directly into processor 1110.

Network interface 1140 may be configured to allow data to be exchanged between computer system 1100 and other devices attached to a network, such as other computer systems, for example. In various embodiments, network interface 1140 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

In some embodiments, system memory 1120 may include a non-transitory, computer-readable storage medium configured to store instructions and data as described above. However, in other embodiments, instructions and/or data may be received, sent or stored upon different types of computer-accessible storage media. Generally speaking, a non-transitory, computer-readable storage medium may include storage media or memory media such as magnetic or optical media, e.g., disk or CD/DVD-ROM coupled to computer system 1100 via I/O interface 1130. A non-transitory, computer-readable storage medium may also include any volatile or non-volatile storage media such as RAM (e.g. SDRAM, DDR SDRAM, RDRAM, SRAM, etc.), ROM, etc, that may be included in some embodiments of computer system 1100 as system memory 1120 or another type of memory. A computer-accessible storage medium may generally be accessible via transmission media or signals such as electrical, electromagnetic, or digital signals, conveyed via a communication medium such as a network and/or a wireless link, such as may be implemented via network interface 1140.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. A system, comprising:
one or more processors;
a memory coupled to the one or more processors; and
one or more storage nodes;
wherein the memory stores program instructions that when executed by the one or more processors cause the one or more processors to implement a database service that provides database services in a multi-tenant environment and in a single-tenant environment to one or more database service clients, wherein a multi-tenant environment comprises an environment in which database tables for multiple clients are hosted collectively in a single database instance, and wherein a single-tenant environment comprises an environment in which database tables for different clients are hosted in different database instances;
wherein the database service is configured to:
receive a request from a client to create a database instance, wherein the request specifies that the database instance is to be created in a multi-tenant environment;
provision one or more of the one or more storage nodes to create a database instance in a multi-tenant environment on behalf of the requesting client;
receive a request from a client to create another database instance, wherein the request specifies that the other database instance is to be created in a single-tenant environment;
provision one or more of the one or more storage nodes to create a database instance in a single-tenant environment on behalf of the requesting client;
receive a request from a client to create a table, wherein the request specifies whether the table is to be created in database instance in a multi-tenant environment or in a single-tenant environment; and create a table in a database instance in the specified environment.

2. The system of claim 1, wherein the database service is further configured to:
  receive and service one or more requests to perform database operations that target the table according to protocols of the specified environment;
  move the table to a database instance in an environment other than the specified environment; and
  receive and service one or more requests to perform database operations that target the table according to protocols of the other environment.

3. The system of claim 1, wherein the client from whom the request to create a database instance in a multi-tenant environment and the client from whom the request to create a database instance in a single-tenant environment are the same client.

4. The system of claim 1, wherein the database service is further configured to:
  receive a request from the client to create another table, wherein the request specifies that the other table is to be created in a database instance in an environment other than the specified environment; and
  create another table in a database instance in the other environment.

5. The system of claim 1,
  wherein to create a database instance in multi-tenant environment, the database service is configured to create an instance of a non-relational database; and
  wherein to create a database instance in a single-tenant environment, the database service is configured to create an instance of a relational database.

6. A method, comprising:
  performing by one or more computers that implement a database service that provides database services in a multi-tenant environment and in a single-tenant environment to database service clients, wherein the multi-tenant environment comprises an environment in which at least portions of tables for multiple clients are hosted collectively in a single database instance or storage node:
    receiving a request to create a table;
    in response to said receiving,
      creating the table in a database instance in a given one of: the multi-tenant environment or the single-tenant environment, wherein one or more storage nodes were provisioned to create the database instance in the given environment;
    receiving and servicing one or more requests to perform database operations that target the table; and
    subsequent to said receiving and servicing:
      moving the table to a database instance in the other one of: the multi-tenant environment or the single-tenant environment, wherein one or more other storage nodes were provisioned to create the database instance in the other environment; and
      receiving and servicing one or more additional requests to perform database operations that target the table.

7. The method of claim 6,
  wherein the method further comprises receiving a request to move the table to a database instance in the other environment; and
  wherein said moving is performed in response to receiving the request to move the table.

8. The method of claim 6,
  wherein the method further comprises determining that the table is to be moved dependent on an observed or desired throughput for receiving and servicing requests to perform database operations that target the table; and
  wherein said moving is performed in response to said determining.

9. The method of claim 6, wherein said moving comprises:
  creating a table in a database instance in the other environment;
  taking a snapshot of the table in the specified environment; and
  copying the snapshot to the table in the database instance in the other environment.

10. The method of claim 9,
  wherein said taking a snapshot comprises storing the snapshot in a key-value storage system; and
  wherein said copying the snapshot to the table comprises retrieving the snapshot from the key-value storage system.

11. The method of claim 6,
  wherein the request to create a table specifies that the table is to be created in a database instance in a multi-tenant environment; and
  wherein the request to create a table further specifies a desired throughput for receiving or servicing requests to perform database operations that target the table.

12. The method of claim 6,
  wherein the request to create a table specifies that the table is to be created in a database instance in a multi-tenant environment; and
  wherein said receiving and servicing one or more requests comprises applying one or more authentication or metering mechanisms to determine whether to service each of the one or more requests.

13. The method of claim 6,
  wherein the request to create a table specifies that the table is to be created in a database instance in a single-tenant environment; and
  wherein said receiving and servicing one or more requests comprises eliding the application of one or more authentication or metering mechanisms that are applied in a multi-tenant environment.

14. The method of claim 6,
  wherein the request to create a table specifies that the table is to be created in a database instance in a single-tenant environment; and
  wherein said receiving and servicing one or more requests comprises accepting and servicing at least some requests that exceed a pre-determined throughput limit for the table.

15. The method of claim 6,
  wherein said receiving a request to create a table comprises receiving the request to create a table on behalf of a database service client on whose behalf one or more other tables have been created in the given environment; and
  wherein said moving comprises moving the table and not moving the one or more other tables.

16. The method of claim 6,
  wherein the request to create a table specifies that the table is to be created in a database instance in a single-tenant environment; and
  wherein the method further comprises:
    receiving a request for connectivity information for the database instance in the single-tenant environment or the table; and returning an IP address through which connections to the table can be established.

17. The method of claim 16, wherein said receiving and servicing one or more requests comprises receiving requests and returning responses through a direct connection established between a client and the returned IP address.

18. The method of claim 16, further comprising scaling the table up or down in response to a change in demand for storage capacity or throughput for the table.

19. A non-transitory, computer-readable storage medium storing program instructions that when executed on one or more computers cause the one or more computers to perform:
receiving a request to create a database table;
in response to said receiving, creating a database table in a database instance in a single-tenant environment of a database service that provides database services in a multi-tenant environment and in the single-tenant environment to database service clients, wherein the multi-tenant environment comprises an environment in which at least portions of tables for multiple clients are hosted collectively in a single database instance or storage node, wherein one or more storage nodes were provisioned to create the database instance in the single-tenant environment;
receiving and servicing one or more requests to access the database table;
determining that the database table should be moved to a database instance in the multi-tenant environment, dependent on an observed, expected, or desired throughput for receiving or servicing requests, wherein one or more other storage nodes were provisioned to create the database instance in the multi-tenant environment; and
in response to said determining, moving the database table to a database instance in the multi-tenant environment.

20. The non-transitory, computer-readable storage medium of claim 19,
wherein said receiving a request to create a table comprises receiving a request message defined by an application programming interface; and
wherein the application programming interface defines request messages that invoke functionality that is common between database instances in a multi-tenant environment and database instances in a single-tenant environment.

21. The non-transitory, computer-readable storage medium of claim 19,
wherein said receiving a request to create a table comprises receiving a request message through a graphical user interface; and
wherein the graphical user interface exposes functionality that is common between database instances in a multi-tenant environment and database instances in a single-tenant environment.

22. A system, comprising:
one or more computers; and
a memory storing program instructions that when executed on the one or more computers cause the one or more computers to perform:
receiving a request to create a database table;
in response to said receiving, creating a database table in database instance in a multi-tenant environment of a database service that provides database services in the multi-tenant environment and in a single-tenant environment to database service clients, wherein the multi-tenant environment comprises an environment in which at least portions of tables for multiple clients are hosted collectively in a single database instance or storage node, and wherein one or more storage nodes were provisioned to create the database instance in the multi-tenant environment;
receiving and servicing one or more requests to access the database table;
determining that at least a portion of the database table should be moved to a database instance in the single-tenant environment, dependent on an observed, expected, or desired throughput for receiving or servicing requests, wherein one or more other storage nodes were provisioned to create the database instance in the single-tenant environment; and
in response to said determining, moving the at least a portion of the database table to a database instance in the single-tenant environment.

23. The system of claim 22,
wherein said determining comprises determining that the at least a portion of the database table has experienced or is expected to experience a higher throughput than can be supported for the database table in the multi-tenant environment; and
wherein said moving the at least a portion of the database table comprises:
taking a snapshot of the at least a portion of the database table; and
creating a new table for that the at least a portion of the database table in a database instance in a single-tenant environment.

24. The system of claim 23, wherein when executed on the one or more computers, the program instructions further cause the one or more computers to perform:
subsequent to said moving, moving the new table to a database instance in a multi-tenant environment in response to a change in an observed, expected, or desired throughput for receiving or servicing requests targeting the new table.

* * * * *